US012723920B2

(12) United States Patent
Takeuchi et al.

(10) Patent No.: US 12,723,920 B2
(45) Date of Patent: Sep. 1, 2026

(54) SYSTEM AND METHOD FOR QUANTUM ABSORPTION SPECTROSCOPY

(71) Applicant: KYOTO UNIVERSITY, Kyoto (JP)

(72) Inventors: Shigeki Takeuchi, Kyoto (JP); Yu Mukai, Kyoto (JP); Ryo Okamoto, Kyoto (JP)

(73) Assignee: Kyoto University, Kyoto (JP)

(*) Notice: Subject to any disclaimer, the term of this patent is extended or adjusted under 35 U.S.C. 154(b) by 65 days.

(21) Appl. No.: 18/694,232

(22) PCT Filed: Sep. 8, 2022

(86) PCT No.: PCT/JP2022/033725

§ 371 (c)(1),
(2) Date: Apr. 19, 2024

(87) PCT Pub. No.: WO2023/053896

PCT Pub. Date: Apr. 6, 2023

(65) Prior Publication Data

US 2024/0385043 A1 Nov. 21, 2024

(30) Foreign Application Priority Data

Sep. 29, 2021 (JP) ................................ 2021-159409

(51) Int. Cl.
*G01J 3/433* (2006.01)
*G01J 3/02* (2006.01)
(Continued)

(52) U.S. Cl.
CPC ............... *G01J 3/433* (2013.01); *G01J 3/021* (2013.01); *G01J 3/0237* (2013.01); *G01J 3/26* (2013.01);
(Continued)

(58) Field of Classification Search
CPC .......... G01J 3/433; G01J 3/021; G01J 3/0237; G01J 3/26; G01J 3/2823; G01J 3/4535;
(Continued)

(56) References Cited

U.S. PATENT DOCUMENTS 7,408,637 B2 * 8/2008 Freeling .................. G01J 3/021 356/300
9,001,320 B2 4/2015 Harel et al.
(Continued)

FOREIGN PATENT DOCUMENTS

JP 2008/216369 A 9/2008
JP 2021-139890 9/2021
WO WO 2021/117632 A1 6/2021

OTHER PUBLICATIONS

Paterova, Anna, et al. Nonlinear infrared spectroscopy free from spectral selection. (Year: 2017).*
(Continued)

*Primary Examiner* — Tarifur R Chowdhury
*Assistant Examiner* — Carlos Perez-Guzman
(74) *Attorney, Agent, or Firm* — Knobbe, Martens, Olson & Bear, LLP

(57) ABSTRACT

An image sensor includes a light receiving surface on which a plurality of pixels are disposed, and detects a signal photon. A memory stores, a correspondence between a parameter indicating the position of each pixel and the wavelength of the signal photon detected by the pixel. A processor executes arithmetic processing for calculating the spectral characteristic of a sample disposed on an optical path of an idler photon. An optical system includes a moving mirror configured to apply modulation to the phase of quantum interference. The processor acquires, from a predetermined number of pixels, a variation in a detection intensity of the signal photon generated by the modulation by moving mirror, and calculates the spectral characteristic
(Continued)

based on the visibility of the quantum interference obtained from the variation and the correspondence.

18 Claims, 17 Drawing Sheets

(51) Int. Cl.
*G01J 3/12* (2006.01)
*G01J 3/26* (2006.01)
*G01J 3/28* (2006.01)
*G02F 1/35* (2006.01)
*G02F 1/355* (2006.01)

(52) U.S. Cl.
CPC .......... *G02F 1/3507* (2021.01); *G02F 1/3551* (2013.01); *G02F 1/3558* (2013.01); *G01J 2003/1213* (2013.01); *G01J 3/2823* (2013.01); *G01J 2003/2826* (2013.01)

(58) Field of Classification Search
CPC .... G01J 3/2803; G01J 3/42; G01J 2003/1213; G01J 2003/2826; G01J 2003/284; G02F 1/3507; G02F 1/3551; G02F 1/3558; G02F 1/3544
See application file for complete search history.

(56) References Cited

U.S. PATENT DOCUMENTS 10,648,908 B2 * 5/2020 Krivitskiy .............. G01N 21/45
2004/0036877 A1 2/2004 Sergienko et al.
2010/0271635 A1 10/2010 Resch
2021/0270671 A1 9/2021 Steinlechner et al.
2023/0020945 A1 1/2023 Takeuchi et al.
2023/0119953 A1 * 4/2023 Fishman ............ G01N 21/3563 359/368

OTHER PUBLICATIONS

Lindner, Chiara, et al. Nonlinear interferometer for Fourier-transform mid-infrared gas spectroscopy using near-infrared detection (Year: 2021).*
Anna Paterova, Hongzhi Yang, Chengwu An, Dmitry Kalashnikov and Leonid Krivitsky, "Measurement of infrared optical constants with visible photons", New Journal of Physics 20 (2018) 043015.
Chiara Lindner, Sebastian Wolf, Jens Kiessling and Frank Kuhnemann, "Fourier transform infrared spectroscopy with visible light", Optics Express vol. 28, Issue 4, pp. 4426-4432 (2020).
Stefan Lerch, Banz Bessire, Christof Bernhard, Thomas Feurer, and Andre Stefanov, "Tuning curve of type-0 spontaneous parametric downconversion", Journal of the Optical Society of America B, vol. 30, Issue 4, pp. 953-958 (2013).
Paul Kaufmann et al. "Mid-IR spectroscopy with NIR grating spectrometers", arxiv.org, Cornell University Library, 201 Online Library Cornell University, (2021).
Armin Hochrainer et al., "Quantum Indistinguishability by Path Identity: The awakening of a sleeping beauty", arxiv.org, Cornell University Library, 201 Online Library Cornell University (2021).
Extended European Search Report, for European Application No. EP 22875768.8, dated Sep. 9, 2025.
Japanese Office Action for Counterpart Application No. JP 2023-550517, dated May 26, 2026, in 9 pages.

* cited by examiner 100
1
LIGHT SOURCE
3
IMAGE SENSOR
OPTICAL SYSTEM
21
201
202
203
204
205
206
207
208
209
210
ΔL
SP
Lp
Ls
Li
4
CONTROLLER
PROCESSOR
41
MEMORY
42
COMMUNICATION I/F
43

<<WITHOUT SAMPLE>>

<<WITH SAMPLE>>

⟨⟨PIXEL POSITION⟩⟩
RADIAL DISTANCE
$\theta_{s2}$
$\theta_{s3}$
$\theta_{s1=0}$
0
⟨⟨LIGHT INTENSITY PROFILE⟩⟩
P1
P2
P3
O
⟨⟨QUANTUM INTERFERENCE WAVEFORM⟩⟩
SIGNAL LIGHT INTENSITY [arb. units]
0
2
4
6
$I_s^{max}$
$I_s^{min}$
0
1
2
3
4
DISPLACEMENT AMOUNT ΔL OF MOVING MIRROR [μm]

| PIXEL COORDINATE | | COLUMN | | | | | | |
|---|---|---|---|---|---|---|---|---|
| | | 1 | 2 | 3 | ··· | n | ··· | N |
| ROW | 1 | | | | | | | |
| | 2 | | | | | | | |
| | 3 | | | | | | | |
| | ⋮ | | | | | | | |
| | m | | | | | $\lambda_s^{m,n}$ | | |
| | ⋮ | | | | | | | |
| | M | | | | | | | |

200
LIGHT SOURCE
1
IMAGE SENSOR
3
OPTICAL SYSTEM
22
201
202
203
204
205
206
207
212
213
214
211
SP 208
Lp
Ls
Li
CONTROLLER
4
PROCESSOR
MEMORY
COMMUNICATION I/F
41
42
43

| RADIAL DISTANCE | WAVELENGTH OF SIGNAL PHOTON |
|---|---|
| 0 | |
| · · · | |
| $r_k$ | $\lambda_s^k$ |
| · · · | |
| R | |

301
LIGHT SOURCE
1
Lp
OPTICAL SYSTEM
23
201
202
203
215
215R 215G 215B
205
206
207
208
SP
209
210
ΔL
Lp
Ls
Li
IMAGE SENSOR
3
6
63 62 61
5
CONTROLLER
4
PROCESSOR
41
MEMORY
42
COMMUNICATION I/F
43

| PIXEL COORDINATE | | COLUMN | | | | | | |
|---|---|---|---|---|---|---|---|---|
| | | 1 | 2 | 3 | ··· | n | ··· | N |
| ROW | 1 | | | | | | | |
| | 2 | | | | | | | |
| | 3 | | | | | | | |
| | ⋮ | | | | | | | |
| | m | | | | | $\lambda_s^{m,n}$ | | |
| | ⋮ | | | | | | | |
| | M | | | | | | | |

R G B

<<PIXEL POSITION>>
RADIAL DISTANCE
$\theta_s$
0
<<LIGHT INTENSITY PROFILE>>
SIGNAL LIGHT INTENSITY
[arb. units]
CORRESPOND TO R
CORRESPOND TO G
CORRESPOND TO B
61
62
63
<<QUANTUM INTERFERENCE WAVEFORM>>
0
0
0
0
20
40
60
80
100
DISPLACEMENT AMOUNT ΔL [μm]

302
23
QUANTUM OPTICAL SYSTEM
1
LIGHT SOURCE
Lp
201
202
203
215
215R
215G
215B
Li
Ls
205
206
207
208
SP
209
210
ΔL
3
IMAGE SENSOR
7
7R
7G
7B
4
CONTROLLER
PROCESSOR
41
MEMORY
42
COMMUNICATION I/F
43

CORRESPOND TO R

| PIXEL COORDINATE | | COLUMN | | | | | | |
|---|---|---|---|---|---|---|---|---|
| | | 1 | 2 | 3 | ··· | n | ··· | N |
| ROW | 1 | | | | | | | |
| | 2 | | | | | | | |
| | ⋮ | | | | | | | |
| | m | | | | | $\lambda_s^{m,n}$ | | |
| | ⋮ | | | | | | | |
| | M | | | | | | | |

CORRESPOND TO G

| PIXEL COORDINATE | | COLUMN | | | | | | |
|---|---|---|---|---|---|---|---|---|
| | | 1 | 2 | 3 | ··· | n | ··· | N |
| ROW | 1 | | | | | | | |
| | 2 | | | | | | | |
| | ⋮ | | | | | | | |
| | m | | | | | $\lambda_s^{m,n}$ | | |
| | ⋮ | | | | | | | |
| | M | | | | | | | |

CORRESPOND TO B

| PIXEL COORDINATE | | COLUMN | | | | | | |
|---|---|---|---|---|---|---|---|---|
| | | 1 | 2 | 3 | ··· | n | ··· | N |
| ROW | 1 | | | | | | | |
| | 2 | | | | | | | |
| | ⋮ | | | | | | | |
| | m | | | | | $\lambda_s^{m,n}$ | | |
| | ⋮ | | | | | | | |
| | M | | | | | | | |

SYSTEM AND METHOD FOR QUANTUM ABSORPTION SPECTROSCOPY

TECHNICAL FIELD

The present disclosure relates to a system and a method for quantum absorption spectroscopy.

BACKGROUND ART

In recent years, in the field of quantum technology such as quantum measurement, quantum communication, and quantum computation, attempts have been made to achieve new functions using quantum entanglement of photon pairs. Hereinafter, a photon pair having a quantum mechanical correlation is referred to as "quantum entangled photon pair". A method for obtaining the spectral characteristic of a sample using the quantum entangled photon pair is called "quantum absorption spectroscopy (QAS)". Various techniques related to the quantum absorption spectroscopy have been proposed in WO 2021/117632 (Patent Document 1) and the like.

CITATION LIST

Patent Literature

PTL 1: WO 2021/117632

Non Patent Literature

NPL 1: Anna Paterova, Hongzhi Yang, Chengwu An, Dmitry Kalashnikov and Leonid Krivitsky, "Measurement of infrared optical constants with visible photons", New Journal of Physics 20 (2018) 043015

NPL 2: Chiara Lindner, Sebastian Wolf, Jens Kiessling and Frank Kuhnemann, "Fourier transform infrared spectroscopy with visible light", Optics Express Vol. 28, Issue 4, pp. 4426-4432 (2020)

NPL 3: Stefan Lerch, Banz Bessire, Christof Bernhard, Thomas Feurer, and Andre Stefanov, "Tuning curve of type-0 spontaneous parametric down-conversion", Journal of the Optical Society of America B, Vol. 30, Issue 4, pp. 953-958 (2013)

SUMMARY OF INVENTION

Technical Problem

Conventional absorption spectroscopy (particularly infrared absorption spectroscopy) is widely used in fields such as molecular identification. Meanwhile, quantum absorption spectroscopy is a new experimental technique reported in 2016. In order to achieve the commercialization and spread (social implementation) of a quantum absorption spectroscopy system in the future, it is desirable to make various implementation improvements such as downsizing of the system, improvement of reliability and robustness, and reduction of the cost of components.

More specifically, in the quantum absorption spectroscopy system described in the prior art, the following method is adopted in order to acquire a spectrum in a desired wavelength range. In NPL 1, wavelength selection of measurement light (signal light) is performed using a dispersive spectroscopic device (spectrometer). In order to perform quantum absorption spectroscopy with high wavelength resolution by this method, it is necessary to introduce a high-resolution spectroscopic device. Then, an increase in a system size, and an increase in the cost of components and the like may be problems. Meanwhile, in NPL 2, Fourier transform spectroscopy using a delay stage is performed. In order to perform quantum absorption spectroscopy with high wavelength resolution by this method, it is necessary to introduce a delay stage capable of sweeping with high accuracy and a long distance, so that the same problems may occur. In addition, it is difficult to ensure reliability and robustness over a long period of time since a mechanical movable device that can be precisely controlled is used in both methods.

The present disclosure has been made to solve the above problems, and an object of the present disclosure is to make the implementation improvements to a system and a method for quantum absorption spectroscopy.

Solution to Problem (1) A system for quantum absorption spectroscopy according to a first aspect of the present disclosure includes an optical system, a photodetector, a memory, and a processor. The optical system is configured to cause quantum interference between a plurality of physical processes in each of which a quantum entangled photon pair of a signal photon and an idler photon is generated by irradiation with pump light. The photodetector includes a light receiving surface on which a plurality of pixels are disposed, and detects the signal photon. The memory stores a correspondence between a parameter indicating the position of each pixel on the light receiving surface and the wavelength of the signal photon detected by the pixel. The processor executes arithmetic processing for calculating the spectral characteristic of a sample disposed on the optical path of the idler photon. The optical system includes a modulation unit that applies modulation to a phase of the quantum interference. The processor acquires, from a predetermined number of pixels disposed on the light receiving surface, a variation in the detection intensity of the signal photon caused by the modulation by the modulation unit. The processor calculates the spectral characteristic based on the visibility of the quantum interference obtained from the variation and the correspondence.

(2) The processor generates the transmittance spectrum of the sample by calculating, for each wavelength of the signal photon corresponding to the predetermined number of pixels, the transmittance of the sample based on the visibility.

(3) The modulation unit includes at least one phase shifter disposed on an optical path of at least one of the signal photon, the idler photon and the pump light. The at least one phase shifter applies modulation to the phase of the quantum interference depending on the position of the pixel on the light receiving surface. The processor acquires the variation from the predetermined number of pixels to which wavelengths of the detected signal photon are the same.

(4) The modulation unit includes a moving mirror disposed on the optical path of one of the signal photon and the idler photon. The moving mirror applies modulation to the phase of the quantum interference depending on the position of the pixel on the light receiving surface. The displacement amount of the moving mirror is shorter than a sub-millimeter order.

(5) The optical system includes a plurality of nonlinear optical elements having mutually different phase matching conditions. The quantum absorption spectroscopy system further includes a plurality of filter elements provided in the photodetector and corresponding to the plurality of nonlinear optical elements. Each of the plurality of filter elements selectively transmits a signal photon generated by a corresponding one of the plurality of nonlinear optical elements.

(6) A method for quantum absorption spectroscopy according to a second aspect of the present disclosure includes first to third steps. The first step is generating a quantum entangled photon pair of a signal photon and an idler photon by irradiating an optical system that is configured to cause quantum interference with pump light. The second step is detecting the signal photon using a photodetector including a light receiving surface on which a plurality of pixels are disposed. The third step is calculating, by a computer, the spectral characteristic of a sample disposed on the optical path of the idler photon. The calculating step includes fourth and fifth steps. The fourth step is acquiring, from a predetermined number of pixels disposed on the light receiving surface, a variation in the detection intensity of the signal photon caused by the modulation applied to the phase of the quantum interference. The fifth step is calculating the spectral characteristic based on the visibility of the quantum interference obtained from the variation and a predetermined correspondence. The correspondence is a relationship between a parameter indicating the position of the pixel on the light receiving surface and the wavelength of the signal photon detected by the pixel.

Advantageous Effects of Invention

According to the present disclosure, implementation improvements can be made to the system and the method for quantum absorption spectroscopy.

DESCRIPTION OF EMBODIMENTS

Figure 1:
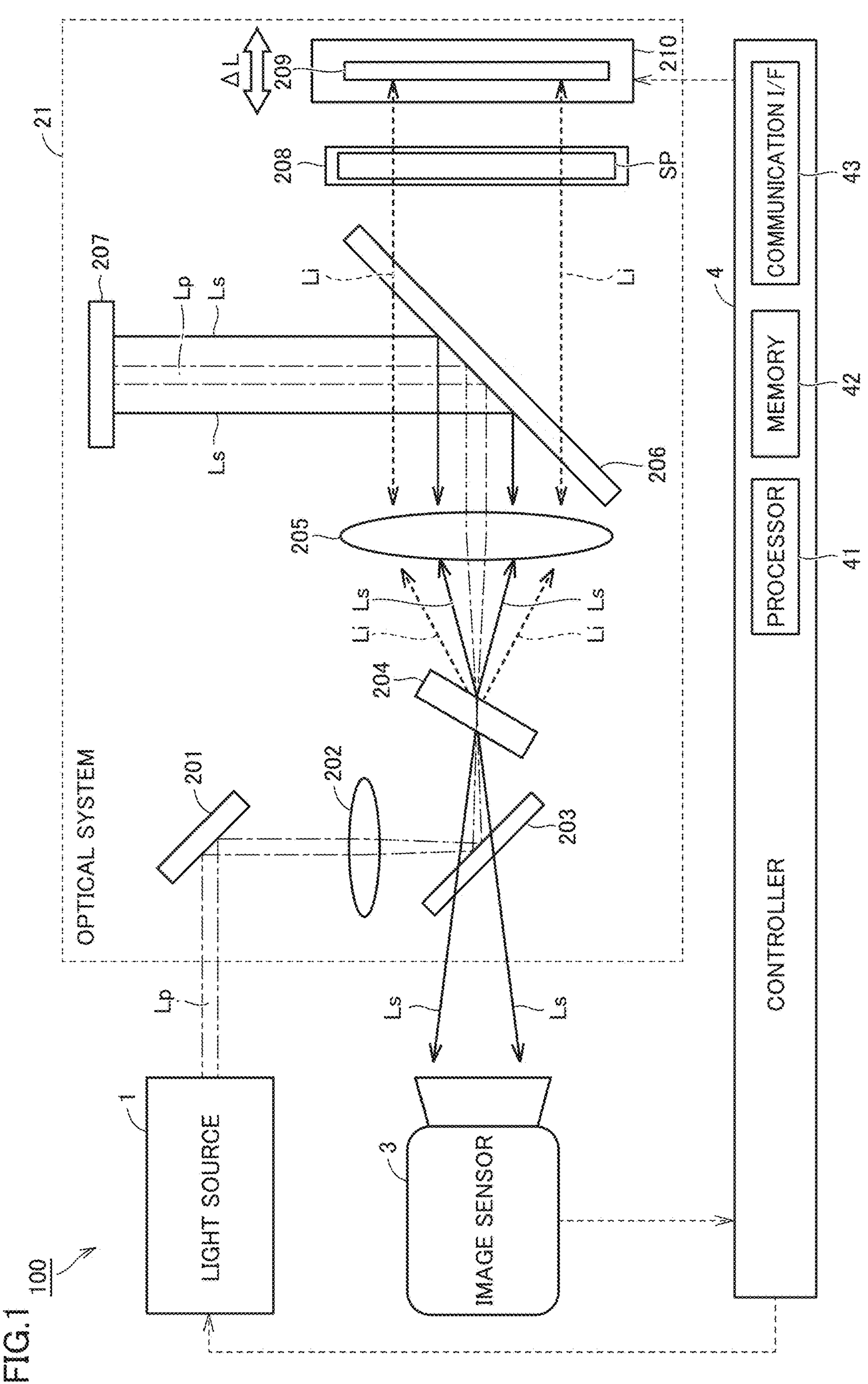
FIG. 1 is a block diagram showing the overall configuration of a quantum absorption spectroscopy system according to a first embodiment.

In the present disclosure and the embodiments thereof, an ultraviolet range means a wavelength range of 10 nm to 360 nm. A visible range means a wavelength range of 360 nm to 1050 nm. A near-infrared range means a wavelength range of 1050 nm to 2 μm. A mid-infrared range means a wavelength range of 2 μm to 5 μm. A far-infrared range means a wavelength range of 5 μm to 50 μm. An infrared range may include all of a near-infrared range, a mid-infrared range, and a far-infrared range.

In the present disclosure and the embodiments thereof, a micrometer order includes a range from 1 μm to 1000 μm (=1 mm). A sub-millimeter order includes a range from 100 μm to 1000 μm (=1 mm). A millimeter order includes a range from 1 mm to 10 mm (=1 cm).

Hereinafter, embodiments of the present invention will be described in detail with reference to the drawings. Note that the same or corresponding parts in the drawings are denoted by the same reference numerals, and the description thereof will not be repeated.

First Embodiment

<System Configuration>

FIG. 1 is a block diagram showing the overall configuration of a quantum absorption spectroscopy (QAS) system according to a first embodiment. A QAS system 100 measures the absorption spectral characteristic of a sample in a near-infrared region using quantum interference. However, a wavelength range that can be measured using the "system for quantum absorption spectroscopy" according to the present disclosure is not limited to the near-infrared range. The "system for quantum absorption spectroscopy" can also measure the absorption spectral characteristic of the sample in an ultraviolet region, a visible region, a mid-infrared region and/or a far-infrared region. QAS system 100 includes a light source 1, an optical system 21, an image sensor 3, and a controller 4.

Light source 1 emits pump light for exciting a nonlinear optical crystal 204 (described later). In the drawing, the optical path of the pump light is denoted by a one-dot chain line with a reference sign Lp. In the present embodiment, light source 1 emits a continuous wave (CW) laser beam included in the visible range. For example, a semiconductor laser that emits a green laser beam having a wavelength of 532 nm can be employed as light source 1. Note that light source 1 may be a light source device externally provided to QAS system 100.

Optical system 21 is configured to cause quantum interference between a plurality of physical processes in each of which a quantum entangled photon pair (a signal photon and an idler photon) is generated. In the figure, the optical path (signal optical path) of signal light is denoted by a solid line with a reference symbol Ls. The optical path (idler optical path) of idler light is denoted by a broken line with a reference symbol Li.

Optical system 21 in this example, is an optical system to which a configuration similar to that of a Michelson interferometer is applied. Optical system 21 includes a mirror 201, a lens 202, a dichroic mirror 203, a nonlinear optical crystal 204, a lens 205, a dichroic mirror 206, a fixed mirror 207, a sample holder 208, a moving mirror 209, and a delay stage 210.

Mirror 201 is disposed between light source 1 and lens 202. Mirror 201 is adjusted so that pump light from light source 1 passes through lens 202.

Lens 202 is disposed between mirror 201 and dichroic mirror 203. Lens 202 is adjusted so as to collect the pump light and focus the collected pump light on nonlinear optical crystal 204.

Dichroic mirror 203 is disposed between lens 202 and nonlinear optical crystal 204 and between nonlinear optical crystal 204 and image sensor 3. Dichroic mirror 203 transmits light in the wavelength range of the signal light and reflects light outside the wavelength range (pump light and idler light). The pump light is reflected by dichroic mirror 203 and applied to nonlinear optical crystal 204.

Nonlinear optical crystal 204 generates signal and idler photons through spontaneous parametric down-conversion (SPDC) of the pump light. As an example, in a case where nonlinear optical crystal 204 is a lithium niobate ($LiNbO_3$) crystal and the pump light has a wavelength of 532 nm, the signal photon is a visible photon in a wavelength range greater than or equal to 603 nm and less than or equal to 725 nm, and the idler photon is an infrared photon in a wavelength range greater than or equal to 2 μm and less than or equal to 4.5 μm. The type of the nonlinear optical crystal 204 is not particularly limited. Other type of nonlinear optical crystal such as a gallium silver sulfide ($AgGaS_2$) crystal may be used. Nonlinear optical crystal 204 is an example of a "nonlinear optical element" according to the present disclosure. The "nonlinear optical element" is not limited to the nonlinear optical crystal, and may be, for example, a quasi phase matching (QPM) element. A four-wave mixing process may be used instead of the SPDC for the generation of quantum entangled photon pairs.

Lens 205 is disposed between nonlinear optical crystal 204 and dichroic mirror 206. Lens 205 collimates the signal light and the idler light from nonlinear optical crystal 204.

Dichroic mirror 206 is disposed between lens 205 and fixed mirror 207 and between lens 205 and sample holder 208. In this example, dichroic mirror 206 reflects visible light and transmits infrared light. The visible-range signal light is reflected by dichroic mirror 206 together with the visible-range pump light, and is directed toward fixed mirror 207. Meanwhile, the infrared-range idler light is transmitted through dichroic mirror 206 and is directed toward sample holder 208.

Fixed mirror 207 is, for example, a flat mirror, and reflects the pump light and the signal light from dichroic mirror 206. The reflected pump light and signal light are reflected again by dichroic mirror 206 to return to nonlinear optical crystal 204. The pump light passes through nonlinear optical crystal 204, but is reflected by dichroic mirror 203. Meanwhile, the signal light passes through nonlinear optical crystal 204 and is also transmitted through dichroic mirror 203 to reach image sensor 3.

Sample holder 208 is disposed between dichroic mirror 206 and moving mirror 209. Sample holder 208 holds a sample (indicated by SP). A material transparent to the idler light (the infrared light in this example) is used as the material of sample holder 208. The idler light is applied to the sample, and the transmitted light is directed to moving mirror 209.

Moving mirror 209 is, for example, a flat mirror, and reflects the idler light transmitted through the sample. The reflected idler light is transmitted through dichroic mirror 206 to return to nonlinear optical crystal 204. The idler light passes through nonlinear optical crystal 204, but does not reach image sensor 3 because it is reflected by dichroic mirror 203.

Moving mirror 209 is installed on delay stage 210 and is configured to be displaced along the idler optical path. In the first embodiment, delay stage 210 is a piezoelectric element that is displaced according to an applied voltage from controller 4. As indicated by an arrow in the drawing, an idler optical path length can be swept by periodically changing (reciprocating) the position of moving mirror 209 using delay stage 210. The displacement amount of moving mirror 209 by delay stage 210 is referred to as $\Delta L$.

Note that moving mirror 209 and delay stage 210 may be disposed on the signal optical path instead of fixed mirror 207. Moving mirror 209 and delay stage 210 are examples of a "modulation unit" according to the present disclosure. The "modulation unit" may include a phase modulator (not shown) such as an electro-optic modulator (EOM) instead of or in addition to moving mirror 209 and delay stage 210.

Image sensor 3 is a multi-pixel photodetector including a light receiving surface in which a plurality of pixels are arranged in an array. Image sensor 3 detects the signal light in response to a control command from controller 4 and outputs the detection signal to controller 4. The plurality of pixels are arranged in a two-dimensional array in this example. More specifically, image sensor 3 is an imaging element such as a charge coupled device (CCD) image sensor, or a complementary metal-oxide-semiconductor (CMOS) image sensor or the like. However, in the first embodiment, it is not essential that the plurality of pixels are arranged in a two-dimensional array, and the plurality of pixels may be arranged in a one-dimensional array.

Controller 4 is, for example, a microcomputer. Controller 4 includes a processor 41 such as a central processing unit (CPU) or a micro processing unit (MPU), a memory 42 such as a read only memory (ROM) and a random access memory (RAM), and an interface 43 with the outside. Although not illustrated, controller 4 is connected to input devices (keyboard, mouse, and the like) and output devices (monitor, printer, and the like) via interface 43.

Controller 4 controls components (light source 1, delay stage 210, image sensor 3) of QAS system 100. Controller 4 executes various types of arithmetic processing for achieving QAS. More specifically, controller 4 executes arithmetic processing for calculating the infrared absorption spectral characteristic of the sample based on the detection signal (quantum interference waveform) from image sensor 3. This arithmetic processing will be described in detail later.

Although not illustrated, the components of optical system 21 (for example, nonlinear optical crystal 204 and fixed mirror 207 and/or nonlinear optical crystal 204 and sample holder 208) may be optically connected by an optical fiber. The "optical system" according to the present disclosure may be an optical system to which a configuration similar to that of a Mach-Zehnder interferometer is applied.

<Measurement Principle>

Figure 2:
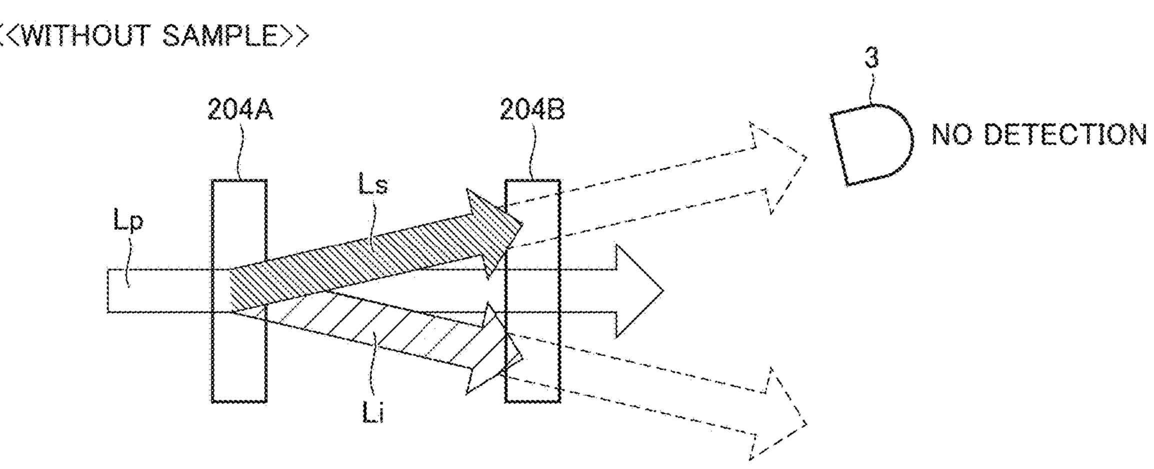
FIG. 2 is a diagram for explaining quantum interference in an optical system.
Figure 2:
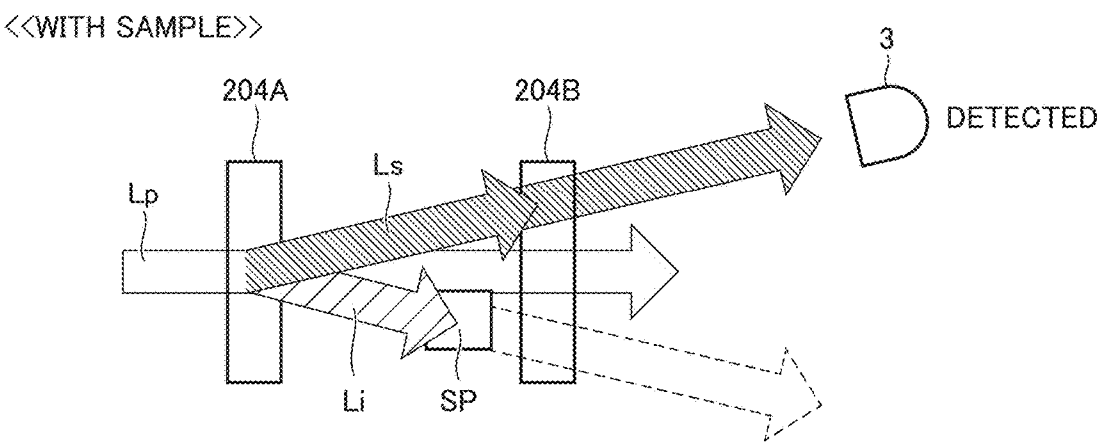

FIG. 2 is a diagram for explaining quantum interference in an optical system 21. In FIG. 2, in order to facilitate the understanding, a configuration in which two nonlinear optical crystals are disposed on the optical path of the pump light will be described as an example. The two nonlinear optical crystals are described as a first crystal 204A and a second crystal 204B. The configuration of optical system 21 shown in FIG. 1 is a configuration in which nonlinear optical crystal 204 serves as both first crystal 204A and second crystal 204B.

When first crystal 204A is irradiated with the pump light from light source 1, one photon having relatively large energy is divided into two photons having smaller energy by the SPDC in first crystal 204A while satisfying the energy conservation law. In the example shown in FIG. 2, from one visible photon (pump photon), a quantum entangled photon pair of one visible photon (signal photon) and one infrared photon (idler photon) is generated. The irradiation of second crystal 204B with the pump light similarly generates a quantum entangled photon pair of one visible photon and one infrared photon. In this example, image sensor 3 is disposed in the direction of travel of the visible photon of the quantum entangled photon pair.

Quantum interference occurs between an event in which a quantum entangled photon pair is generated by first crystal 204A (first physical process) and an event in which a quantum entangled photon pair is generated by second crystal 204B (second physical process). More specifically, when a probability amplitude representing the first physical process and a probability amplitude representing the second physical process are added, if the two probability amplitudes are in the same phase, the first physical process and the second physical process intensify each other, whereas, if the two probability amplitudes are in opposite phases, the first physical process and the second physical process cancel each other (quantum interference effect). Hereinafter, interference (destructive interference) in which the first physical process and the second physical process cancel each other will be described as an example. However, optical system 21 may cause interference (constructive interference) in which the first physical process and the second physical process intensify each other.

When a sample that is an infrared absorber is not disposed on the idler optical path, the first physical process and the second physical process are indistinguishable from each other, and the first physical process and the second physical process cause quantum interference (cancel each other in this example). In this case, it is observed that a quantum entangled photon pair is not generated at the post stage of second crystal 204B. That is, the signal light (visible photon) is not detected by image sensor 3.

In contrast, when the sample is disposed on the idler optical path, the idler light is absorbed by the sample. Then, the first physical process and the second physical process can be distinguished, whereby quantum interference between the first physical process and the second physical process becomes incomplete. As a result, the signal light is detected by image sensor 3.

As described above, in the QAS, one visible photon (signal photon) of the quantum entangled photon pair is detected by image sensor 3, which makes it possible to determine that the other infrared photon (idler photon) is absorbed by the sample. Note that, here, an example in which optical system 21 causes quantum interference between two physical processes has been described. However, the "optical system" according to the present disclosure may cause quantum interference among three or more physical processes.

<Arithmetic Processing>

In QAS system 100 according to the present embodiment, the angular dependence of the wavelength of the signal photon is actively used in arithmetic processing for calculating the infrared absorption spectral characteristic of the sample.

Figure 3:
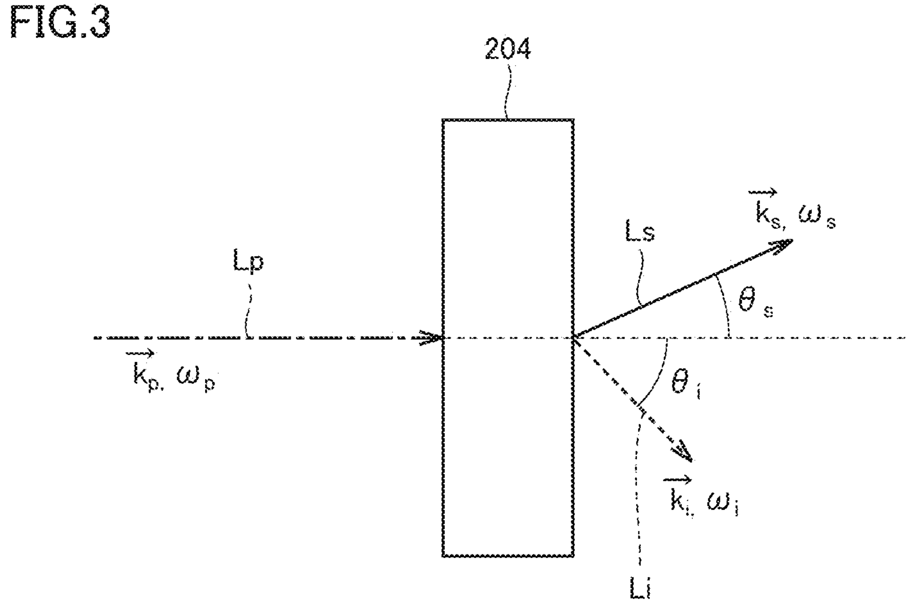
FIG. 3 is a diagram for explaining the angle dependence of the wavelength of a signal photon.

FIG. 3 is a diagram for explaining the angle dependence of the wavelength of a signal photon. Hereinafter, an angle formed by a wave number vector $k_p$ of the pump light and a wave number vector $k_s$ of the signal photon is referred to as "radiation angle $\theta_s$". An angle formed by wave number vector $k_p$ of the pump light and wave number vector $k_i$ of the idler photon is referred to as "radiation angle $\theta_i$".

The generation of the signal photon and the idler photon in the same direction as that of the pump light ($\theta_s \sim 0$ and $\theta_i \sim 0$) is called coaxial generation. In the SPDC, the signal photon and the idler photon can also non-coaxially occur. That is, radiation angle $\theta_s$ of the signal photon and radiation angle $\theta_i$ of the idler photon may be values significantly greater than 0. In FIG. 3, in order to facilitate the understanding, radiation angles $\theta_s$ and $\theta_i$ are illustrated to be greater than in reality.

As described above, the energy conservation law is satisfied in the SPDC, and the following relational equation (1) holds up where $\omega_p$ is the angular frequency of the pump light, $\omega_s$ is the angular frequency of the signal photon, and $\omega_i$ is the angular frequency of the idler photon.

[Expression 1]

$$\omega_p = \omega_s + \omega_i \tag{1}$$

Equation (1) is rewritten as the following equation (2) using a wavelength. $\lambda_p$ is the wavelength of the pump light, $\lambda_s$ is the wavelength of the signal photon, and $\lambda_i$ is the wavelength of the idler photon.

[Expression 2]

$$\frac{1}{\lambda_p} = \frac{1}{\lambda_s} + \frac{1}{\lambda_i} \tag{2}$$

The quantum entangled photon pair may generate at various wavelength combinations ($\lambda_s$, $\lambda_i$) satisfying equation (2). However, in order to generate the quantum entangled photon pair with high efficiency, it is further required that the following relational equation (3) holds up among the wave number vectors of the pump light, the signal photon, and the idler photon.

[Expression 3]

$$\overrightarrow{k_p} = \overrightarrow{k_s} + \overrightarrow{k_i} \tag{3}$$

The relationship expressed by equation (3) is also called a phase matching condition and corresponds to the momentum conservation law of the photon. The absolute value of the wave number vector is expressed by the following equation (4) using a wavelength $\lambda$ of the photon and a refractive index n of nonlinear optical crystal 204.

[Expression 4]

$$|\vec{k}| = \frac{n(\lambda)}{\lambda} \quad (4)$$

Refractive index n depends on wavelength λ. When wavelength λ of the photon is different, refractive index n is different, and the phase matching condition to be satisfied is different. As a result, when a combination of wavelengths ($\lambda_s$, $\lambda_i$) is determined between the signal photon and the idler photon, main radiation angles $\lambda_s$ and $\theta_i$ are determined accordingly. As described above, wavelength $\lambda_s$ of the signal photon generated by the SPDC depends on radiation angle $\theta_s$. Therefore, wavelength $\lambda_s$ can be specified from radiation angle $\theta_s$ by obtaining in advance a correspondence between wavelength $\lambda_s$ and radiation angle $\theta_s$ of the signal photon of QAS system 100.

Note that NPL 3 discloses an example of a simulation result showing the angle dependence of wavelength $\lambda_s$ of the signal photon (specifically, the simulation result of a signal light intensity S according to angular frequency $\omega_s$ (corresponding to wavelength $\lambda_s$) and a lateral wave number component $q_{s,x}$ (corresponding to radiation angle $\theta_s$)).

Figure 4:
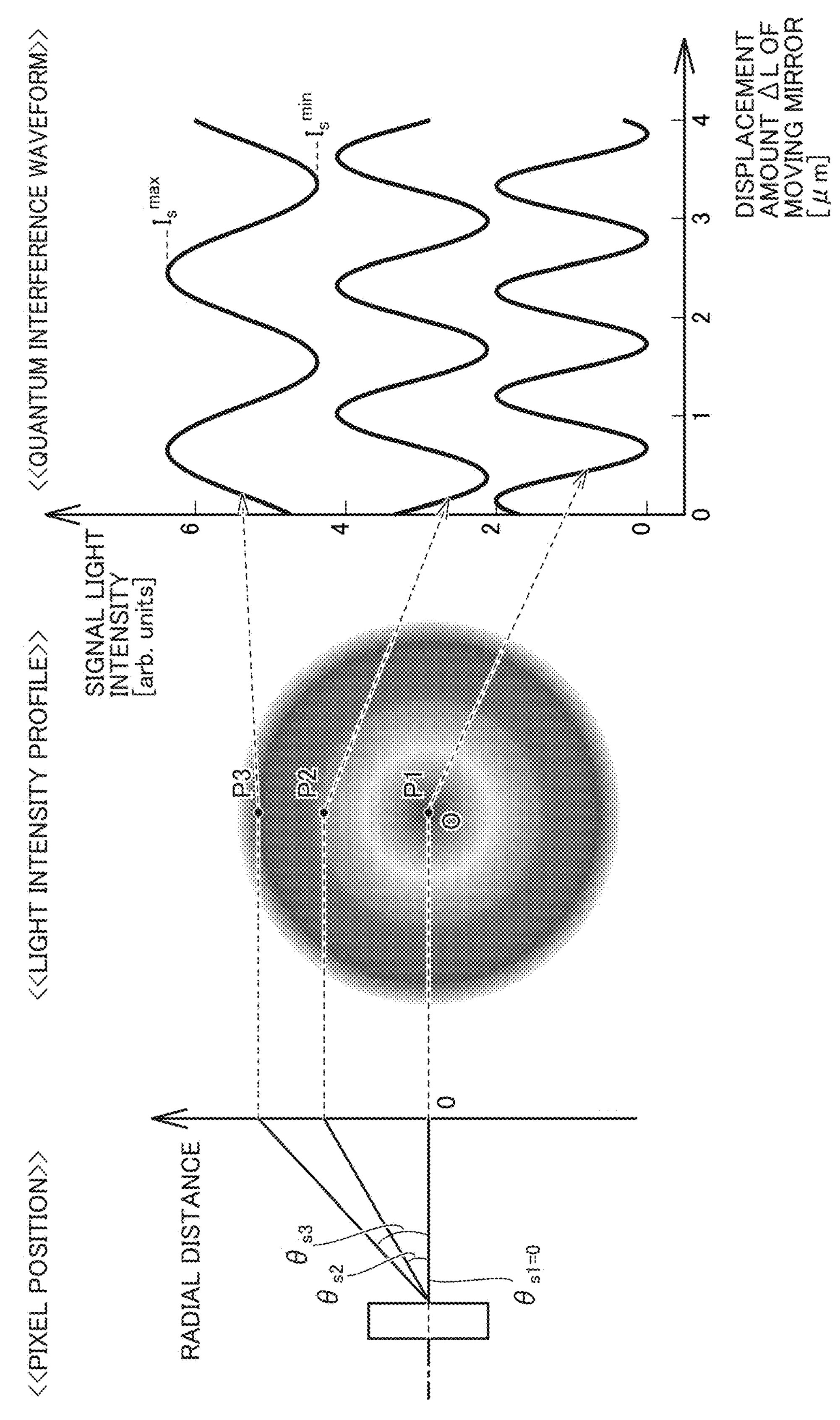
FIG. 4 is a diagram for explaining the details of arithmetic processing by a controller in the first embodiment.

FIG. 4 is a diagram for explaining the details of arithmetic processing by a controller 4 in the first embodiment. As the idler light passes through the sample, the number of idler photons decreases depending on the transmittance of the sample. The extent to which the number of idler photons decreases can be quantitatively evaluated from the number of signal photons as described in FIG. 2. In the present embodiment, the light intensity profile of the signal photon is measured using image sensor 3. The light intensity profile is the distribution of the number of detected signal photons (signal light intensity) by a plurality of pixels arranged in a two-dimensional array.

FIG. 4 shows an example in which the shape of the light intensity profile at light receiving surface is circular. In the middle diagram, three pixels P1 to P3 located on the same diameter are illustrated.

In general, the light intensity profile of the signal photon and the radiation angle dependence of the wavelength vary depending on the shape and phase matching condition of the nonlinear optical element (nonlinear optical crystal 204 in this example). Therefore, the shape of the light intensity profile is not limited to an isotropic circular shape as shown in FIG. 4. For example, when a slab waveguide device is used to generate the quantum entangled photon pairs, a linearly extending intensity distribution is obtained as the light intensity profile. When the SPDC according to the Type-II phase matching condition of a bulk nonlinear optical crystal is used for the generation of the quantum entangled photon pairs, a plurality of annular intensity distributions are obtained as the light intensity profile.

When measuring the signal light intensity for each pixel, controller 4 controls delay stage 210 to displace moving mirror 209 along the idler optical path. Then, the phase of the quantum interference is temporally modulated according to a displacement amount ΔL of moving mirror 209. As a result, as shown in the right figure, for each pixel, a variation in the signal light intensity from the pixel is acquired as a quantum interference waveform corresponding to displacement amount ΔL of moving mirror 209 (for details, see equations (1) to (9) of Patent Document 1). The horizontal axis of the quantum interference waveform in the first embodiment is displacement amount ΔL of moving mirror 209. The vertical axis represents the signal light intensity. The vertical axis may be a signal photon count rate (the number of detected signal photons per unit time).

The quantum interference waveforms shown in FIG. 4 and FIG. 10 to be described later are results of simulation in which quantum entangled photon pairs are generated by irradiating a QPM element with pump light having a wavelength of 532 nm. The polarization inversion period of the QPM element was 9.02 μm, and the material of the QPM element was calcium titanate phosphate. The pixels P1, P2, and P3 respectively detect signal photons with radiation angles $\theta_s$=0°, 25°, and 35°. The wavelengths of the idler photons corresponding to the signal photons with radiation angles $\theta_s$=0°, 25°, and 35° are respectively 1.064 μm, 1.3 μm, and 1.8 μm.

As described in FIG. 3, strictly speaking, the signal photons are spatially separated according to wavelength $\lambda_s$. Therefore, wavelength $\lambda_s$ of the detected signal photon can be specified by knowing in which pixel the signal photon is detected. Therefore, in the present embodiment, a correspondence between the coordinate of the pixel and wavelength $\lambda_s$ of the signal photon is obtained in advance for each pixel, and is stored in memory 42 of controller 4 in the form of, for example, a map (data table). The correspondence may be stored in memory 42 as a function (relational equation). Wavelength $\lambda_s$ of the signal photon detected in each pixel can be calculated based on equations (2) to (4).

Figure 5:
FIG. 5 is a conceptual diagram showing an example of a map in the first embodiment.

FIG. 5 is a conceptual diagram showing an example of a map in the first embodiment. In a map MP1, wavelength $\lambda_s$ of the signal photon detected by each of a plurality of pixels is defined. By referring to map MP1, it is possible to associate the signal light intensity with wavelength $\lambda_s$ for each pixel. Note that the pixel coordinate is an example of a "parameter" according to the present disclosure.

In general, the degree of coherence in a quantum interferometer is evaluated by visibility representing the degree of variation in a signal light intensity. Specifically, referring back to FIG. 4, for a certain pixel (for example, pixel P3), visibility V ($\lambda_s$) of the quantum interference at wavelength $\lambda_s$ of the signal photon is given by the following equation (5) using maximum value $I_s^{max}$ and minimum value $I_s^{min}$ of the signal light intensity.

[Expression 5]

$$V(\lambda_s) = \frac{I_s^{max} - I_s^{min}}{I_s^{max} + I_s^{min}} \quad (5)$$

Since it is sufficient to obtain maximum value $I_s^{max}$ and minimum value $I_s^{min}$ of the signal light intensity from equation (5), it is understood that it is not always necessary to acquire a smooth quantum interference waveform by continuously measuring the signal light intensity. For example, it is sufficient to coarsely measure the signal light intensities at about eight points per wavelength. The quantum interference waveform corresponds to a "variation in the detection intensity of a signal photon caused by modulation by a modulation unit (moving mirror 209 in this example)".

A transmittance T ($\lambda_i$) of the sample at wavelength $\lambda_i$ of the idler photon is calculated by the ratio of the visibilities under two conditions as shown in the following equation (6). $V_0$ ($\lambda_s$) is visibility under the condition where no sample is disposed in sample holder 208. V ($\lambda_s$) is visibility under the condition where the sample is disposed in sample holder 208. Note that wavelength $\lambda_i$ of the idler photon on the left side is uniquely determined from wavelength $\lambda_s$ of the signal photon (see equation (2)).

[Expression 6]

$$T(\lambda_i) = \frac{V(\lambda_s)}{V_0(\lambda_s)} \quad (6)$$

Similarly, quantum interference waveforms having mutually different phases and periods are acquired for other pixels (for example, pixels P1, P2). Visibility V is calculated from the quantum interference waveform, and transmittance T is calculated from visibility V. By calculating transmittance T for a predetermined number of pixels, the transmittance spectrum of the sample can be generated.

<Comparison with Prior Art>

In order to measure the signal light intensity for the wavelength of the signal photon in the system disclosed in NPL 1, it is essential to disperse the signal photons using a spectroscope (see FIG. 2 of NPL 1). However, the spectroscope may increase the size of the system or increase the cost of components of the system.

In the system disclosed in NPL 2, spectroscopy using a spectroscope is not performed. In this system, for each pixel, a signal light intensity on a spatial axis (displacement axis) is converted into a signal light intensity on a wavelength axis by the mathematical operation of Fourier transform on the signal light intensity (see FIG. 2 of NPL 2). The wavelength resolution of the system in which the Fourier transform is performed depends, in principle, on the sweep width of the idler optical path length (the displacement amount of the moving mirror). In order to achieve high resolution (for example, wave number resolution of 1 $cm^{-1}$), it may be required to set the sweep width of the idler optical path length to be a submillimeter order or more (typically about 1 mm). In NPL 2, the sweep width of the idler optical path length is set to 800 μm×2=1.6 mm. However, a mechanical stage (motor driving device) capable of precisely controlling such a large sweep width is very expensive. In a mechanically operating movable portion, abnormality such as failure or malfunction tends to easily occur as compared with an electrically or optically operating portion. Thus, the adoption of a mechanical stage may cause a reduction in the reliability and robustness of the QAS system.

In contrast, the present embodiment focuses on the fact that the signal photons are spatially separated according to wavelength $\lambda_s$, and uses a correspondence between the pixel coordinate in each of the plurality of pixels and wavelength $\lambda_s$ of the signal photon (see FIG. 5). By using this correspondence, the signal light intensity and wavelength $\lambda_s$ can be associated with each other without dispersing the signal photon using the spectrometer.

Furthermore, the present embodiment executes arithmetic processing based on the visibility of quantum interference instead of the Fourier transform. To calculate the visibility of the quantum interference, it is only necessary to displace moving mirror 209 by about the same distance as the wavelength (maximum wavelength to be measured) of the idler light. More specifically, since visibility V of the quantum interference is given by maximum value $I_s^{max}$ and minimum value $I_s^{min}$ of the signal light intensity (see equation (5)), the signal light intensities at the positions of the peak and valley of the quantum interference waveform need to be obtained. For this reason, in the shortest case, it is only necessary to displace moving mirror 209 by one wavelength of the idler light. Even in consideration of measurement accuracy, it is sufficient to set displacement amount ΔL of moving mirror 209 to about twice the wavelength of the idler light. As in this example, when the wavelength of the idler light is in a wavelength range of 2 μm to 4.5 μm, displacement amount ΔL may be 9 μm or less. Even when the idler light is in the far-infrared range (5 μm to 50 μm), displacement amount ΔL may be 100 μm or less. That is, displacement amount ΔL of moving mirror 209 can be set to be shorter than a sub-millimeter order.

Since displacement amount ΔL of moving mirror 209 may be shorter than the sub-millimeter order, a piezoelectric element can be employed as delay stage 210. The piezoelectric element is not suitable for sweeping in a millimeter order. Meanwhile, since the piezoelectric element does not include a mechanically movable portion, abnormality hardly occurs, and the piezoelectric element is smaller and more inexpensive than a precise mechanical stage. Therefore, according to the present embodiment, the reliability and robustness of QAS system 100 can be improved. In addition, the cost of components and the size of QAS system 100 can be reduced. Furthermore, since displacement amount ΔL of moving mirror 209 is shortened, a measurement time can be shortened.

<Calculation of Visibility of Quantum Interference>

A method for calculating visibility V of the quantum interference is not limited to the method according to the definition equation shown in the above equation (5). For example, the following two methods can be used.

Figure 6:
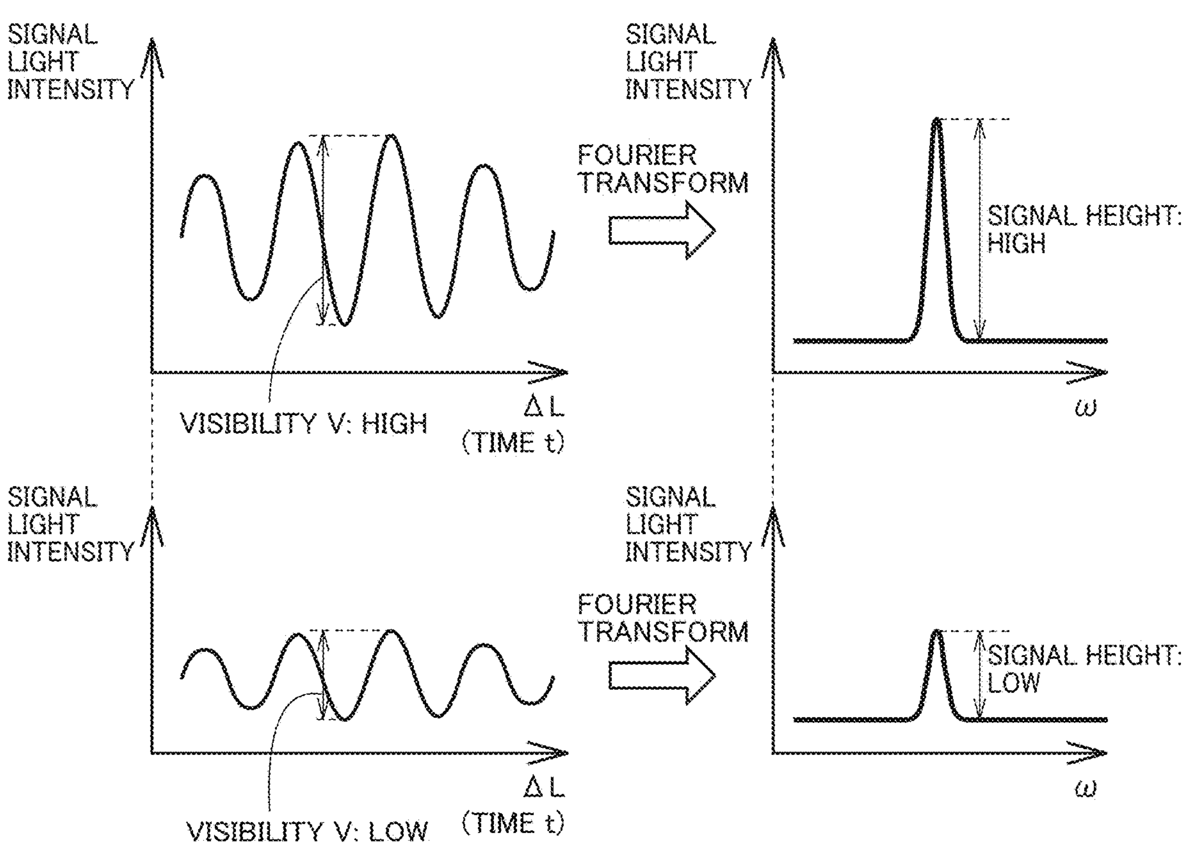
FIG. 6 is a diagram for explaining another method of calculating the visibility of quantum interference.

FIG. 6 is a diagram for explaining another method of calculating visibility V of the quantum interference. By displacing moving mirror 209 by several wavelengths of the idler light, a quantum interference waveform for several periods is measured. As described later, the quantum interference waveform can also be measured by adjusting a phase shift amount by a phase shifter 214 (see FIG. 9). When the quantum interference waveform is Fourier-transformed, a signal of a specific frequency is obtained. There is a correspondence between the height of this signal and visibility V of the quantum interference. When visibility V is large, a signal height after the Fourier transform is high. Meanwhile, when visibility V is small, a signal height after the Fourier transform is low. Therefore, by obtaining the correspondence in advance, visibility V of the quantum interference can be calculated from the signal height after the Fourier transform. According to this method, visibility V of the quantum interference can be accurately calculated even in coarse measurement in which the number of measurement points of the quantum interference waveform is small.

Figure 7:
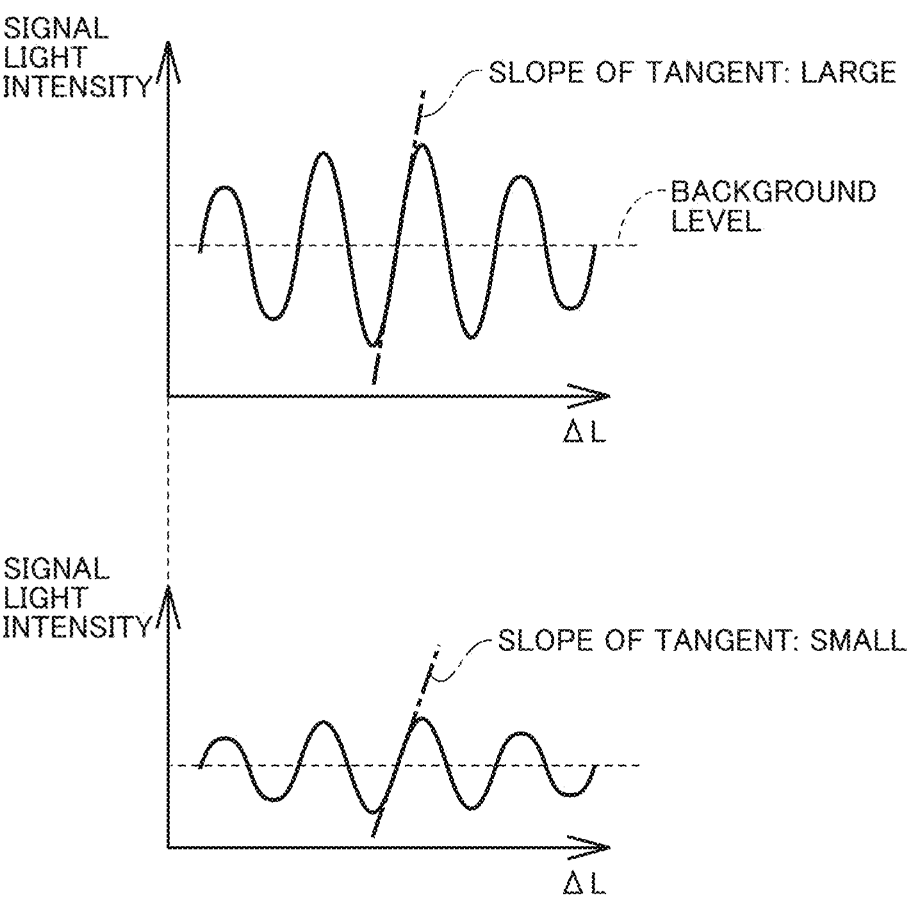
FIG. 7 is a diagram for explaining still another method of calculating the visibility of the quantum interference.

FIG. 7 is a diagram for explaining still another method of calculating visibility V of the quantum interference. First, similarly to FIG. 6, the quantum interference waveform is measured by the displacement of moving mirror 209 or phase shift by phase shifter 214. In this method, the differential coefficient (the slope of a tangent indicated by a one-dot chain line) of the quantum interference waveform near the background level (the signal light intensity when the quantum interference does not occur) is calculated. There is a correspondence between the slope of the tangent and visibility V of the quantum interference. When visibility V is large, the slope of the tangent is large. Meanwhile, when visibility Vis small, the slope of the tangent is small. Therefore, by obtaining the correspondence in advance, visibility V of the quantum interference can be calculated from the slope of the tangent. According to this method, only the differential coefficient of the quantum interference waveform needs to be calculated, so that the quantum interference waveform only needs to be a little over a half period. That is, the period of the quantum interference waveform may be smaller than that of the method using equation (5) and the method of FIG. 6. Therefore, the displacement amount of moving mirror 209 or the phase shift amount by phase shifter 214 can be reduced.

<Processing Flow>

Figure 8:
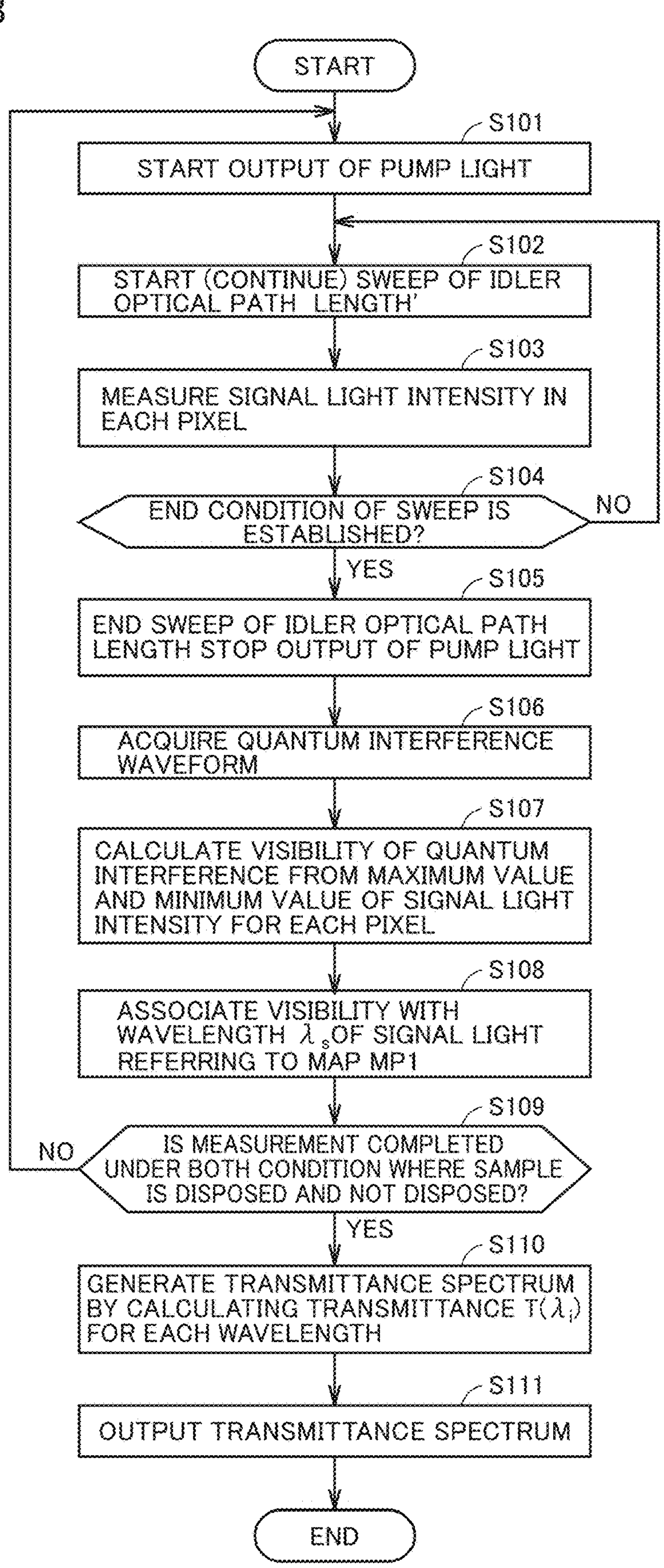
FIG. 8 is a flowchart showing the processing procedure of a quantum absorption spectroscopy method in the first embodiment.

FIG. 8 is a flowchart showing the processing procedure of a QAS method in the first embodiment. This flowchart is called from a main routine and executed when an input device receives a predetermined operation (for example, pressing of a start switch) by a measurer. Each step is basically achieved by software processing by a controller 4 (processor 41), but may be achieved by hardware processing by an electronic circuit disposed in controller 4. The same applies to a flowchart of FIG. 12 to be described later. Hereinafter, step is abbreviated as "S". In this description, it is assumed that a sample is not disposed in a sample holder 208 at the start of execution of the flowchart.

In S101, controller 4 controls a light source 1 so as to start the output of pump light.

In S102, controller 4 controls a delay stage 210 provided in a moving mirror 209 so as to start or continue the sweep of an idler optical path length. As described above, in the present embodiment, a displacement amount ΔL of moving mirror 209 may be shorter than a sub-millimeter order (that is, may be 100 μm or less).

In S103, controller 4 measures a signal light intensity in each of a plurality of pixels provided on the light receiving surface of an image sensor 3 based on a detection signal from image sensor 3.

In S104, controller 4 determines whether a condition for ending the sweep of the idler optical path length is established. For example, controller 4 can determine that an end condition is established when the idler optical path length is swept for a prescribed number of times or a prescribed time. When the end condition is not established (NO in S104), controller 4 returns the processing to S102. Then, the processings of S102 and S103 are repeated until the end condition is established.

When the end condition is established (YES in S104), controller 4 advances the processing to S105 and controls light source 1 so as to stop the output of the pump light. Controller 4 controls delay stage 210 so as to stop the sweep of the idler optical path length.

In S106, controller 4 acquires a quantum interference waveform (see a right diagram in FIG. 4) for each target pixel. More specifically, controller 4 plots the signal light intensity with respect to displacement amount ΔL of moving mirror 209. As a result, a temporally modulated quantum interference waveform is acquired.

In S107, controller 4 calculates, for each pixel, visibility $V_0$ of quantum interference under the condition where a sample is not disposed from maximum value $I_s^{max}$ and minimum value $I_s^{min}$ of the signal light intensity according to the above equation (5). Controller 4 may calculate visibility $V_0$ of the quantum interference according to the method described in FIG. 6 or 7.

In S108, controller 4 associates, for each pixel, visibility $V_0$ of quantum interference in the pixel with wavelength $\lambda_s$ of the signal photon using a map MP1 (see FIG. 5) prepared in advance and stored in a memory 42. Note that it is also conceivable that map MP1 is stored in an external server (not illustrated). In that case, controller 4 can associate visibility $V_0$ with wavelength $\lambda_s$ of the signal photon by communication with the external server.

In S109, controller 4 determines whether the calculation of both the visibility V ($\lambda_s$) of the quantum interference under the condition where the sample is disposed and visibility $V_0$ ($\lambda_s$) of the quantum interference under the condition where the sample is not disposed is completed. In this example, visibility V ($\lambda_s$) of the quantum interference under the condition where the sample is disposed is not calculated at this stage. Therefore, the sample is disposed in sample holder 208 (not illustrated), and the processing returns to S101 (NO in S109). Then, controller 4 executes the processings of S101 to S108 under the condition where the sample is disposed. By doing this, visibility V ($\lambda_s$) of the quantum interference associated with wavelength $\lambda_s$ of the signal photon is calculated (YES in S109), and the processing proceeds to S110.

In S110, controller 4 calculates a transmittance T ($\lambda_i$) for each wavelength $\lambda_i$ of the idler photons by taking a ratio between visibility V and visibility $V_0$ of the quantum interference for each wavelength $\lambda_s$ of the signal photons according to the above equation (6). As a result, a transmittance spectrum in the infrared region of the sample is generated. Thereafter, controller 4 outputs the transmittance spectrum of the sample to an output device such as a monitor or transmits the transmittance spectrum to an external server via an interface 43 (S111). This completes the series of processings.

Map MP1 can be appropriately updated at the time of the calibration of QAS system 100, or the like. More specifically, a material (standard sample) of which a transmittance spectrum in an infrared region is examined in detail is disposed in sample holder 208. Controller 4 generates the transmittance spectrum from the measurement result of the material, and compares the generated transmittance spectrum with a known transmittance spectrum (calibration spectrum). By calibrating map MP1 so as to reduce an error between the two spectra, the latest state of QAS system 100 (characteristic of a nonlinear optical crystal 204, optical path deviation in an optical system 21, and the like) can be reflected in map MP1.

As described above, in the first embodiment, the angle dependence of wavelength $\lambda_s$ of the signal photon is used to link the light intensity profile on the light receiving surface of image sensor 3 to wavelength $\lambda_s$ of the signal photon. For example, as described with reference to FIG. 5, a correspondence between the pixel coordinate on the light receiving surface of image sensor 3 and wavelength $\lambda_s$ of the signal photon is stored in advance in memory 42 of controller 4 in the form of a map. By using this correspondence, it is possible to obtain, without using a spectrometer, the measurement result of the signal light intensity corresponding to that of dispersing the signal photons. Therefore, according to the first embodiment, it is possible to reduce the cost of components while reducing the size of QAS system 100.

In the first embodiment, the visibility of the quantum interference is calculated from the quantum interference waveform. This enables to employ a piezoelectric element as delay stage 210 instead of a mechanical stage since displacement amount ΔL of moving mirror 209 by delay stage 210 can be shortened. Therefore, according to the first embodiment, the reliability and robustness of QAS system 100 can be improved. In addition, the size of QAS system 100 can be reduced, and the cost of components can also be reduced.

In the present embodiment, the example of measuring the transmittance spectrum of the sample has been described, but other spectral characteristic (reflectance spectrum, complex transmittance spectrum, and the like) of the sample may be measured using QAS system 100.

Second Embodiment

<System Configuration>

Figure 9:
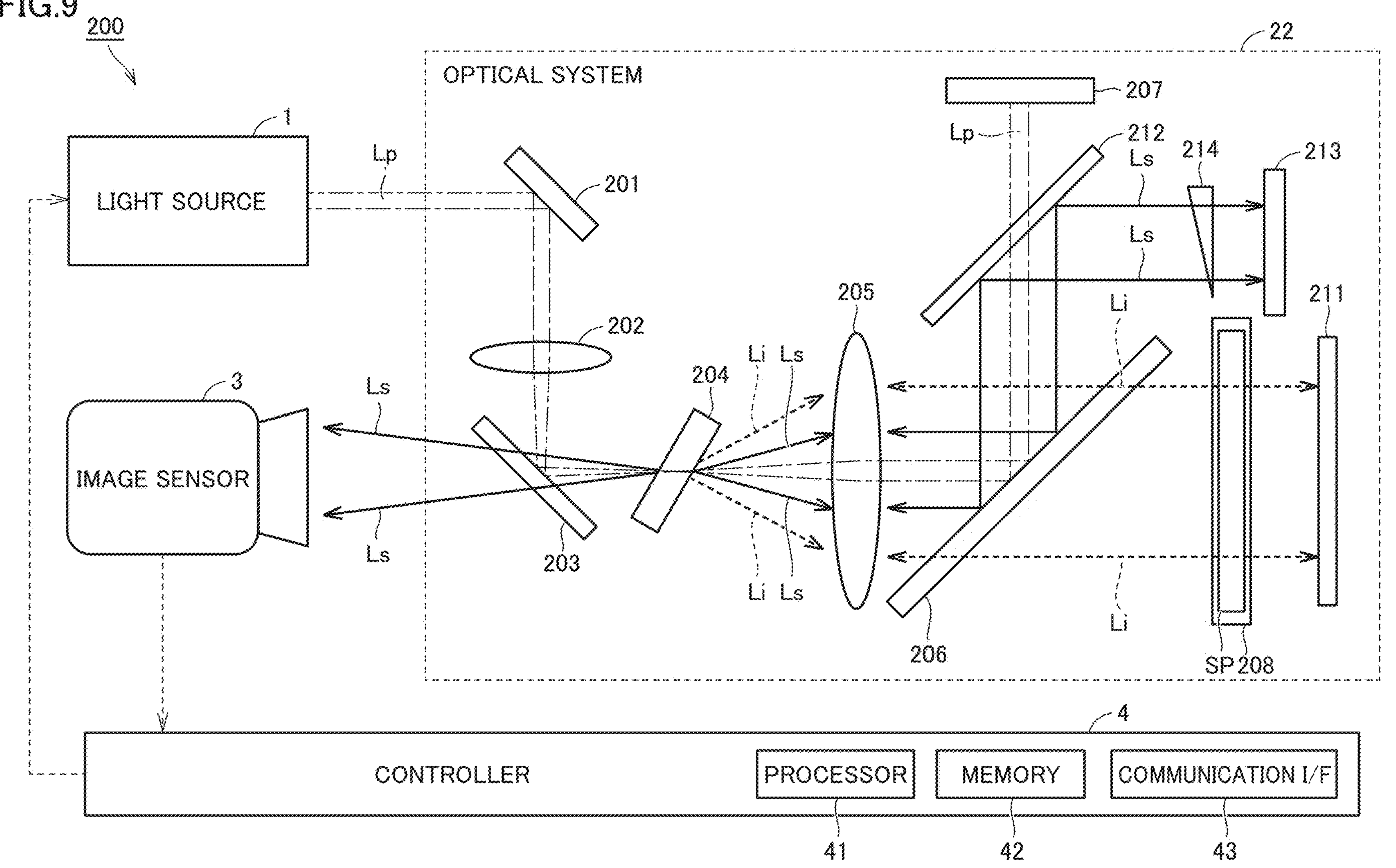
FIG. 9 is a block diagram showing the overall configuration of a quantum absorption spectroscopy system according to a second embodiment.

FIG. 9 is a block diagram showing the overall configuration of a QAS system according to a second embodiment. A QAS system 200 includes an optical system 22 instead of optical system 21 (see FIG. 1). Optical system 22 is different from optical system 21 in that optical system 22 includes a fixed mirror 211, a dichroic mirror 212, a fixed mirror 213, and a phase shifter 214 instead of moving mirror 209 and delay stage 210.

Fixed mirror 211 is, for example, a flat mirror, and reflects idler light transmitted through a sample. Fixed mirror 211 is not provided with a delay stage. That is, in the second embodiment, an idler optical path length is not swept.

Dichroic mirror 212 is disposed between a dichroic mirror 206 and a fixed mirror 207 and between dichroic mirror 206 and fixed mirror 213. Dichroic mirror 212 transmits light in the wavelength range of pump light and reflects light outside the wavelength range. The pump light is transmitted through dichroic mirror 212 and is directed toward fixed mirror 207. Meanwhile, the signal light is reflected by dichroic mirror 212 and is directed toward fixed mirror 213.

Fixed mirror 213 is, for example, a flat mirror, and reflects signal light from dichroic mirror 212. The reflected signal light is reflected again by dichroic mirror 212, and returned to a nonlinear optical crystal 204.

Phase shifter 214 is disposed between dichroic mirror 212 and fixed mirror 213. Phase shifter 214 is made of a material that is transparent to signal photons and has a refractive index in the wavelength region of the signal photons significantly greater than that of a medium (usually air). Examples of such a material include glass and quartz. Phase shifter 214 is configured so that a signal optical path length in phase shifter 214 varies according to the propagation path of the signal photons spreading at a radiation angle $\theta_s$. For example, as shown in FIG. 9, phase shifter 214 may have a triangular prism shape with a wedge-shaped cross section in a direction parallel to a signal optical path. The shape of phase shifter 214 may be a quadrangular prism shape having a trapezoidal cross section in a direction parallel to the signal optical path. In addition, phase shifter 214 may have a shape (cylindrical shape or the like) in which the signal optical path length changes along the circumferential direction of the cross section.

Although not illustrated, in optical system 22, at least one phase shifter may be disposed on at least one of the signal optical path, the idler optical path, and the optical path of the pump light. That is, phase shifter 214 may be disposed in the idler optical path (for example, between dichroic mirror 206 and fixed mirror 211) instead of the signal optical path. Phase shifter 214 may be disposed on the optical path of the pump light (for example, between dichroic mirror 212 and fixed mirror 207). In addition, a plurality of phase shifters 214 may be disposed. For example, two or more phase shifters 214 may be disposed on the signal optical path. One or more phase shifters 214 may be disposed on each of the signal optical path and the idler optical path. One or more phase shifters 214 may be disposed on the signal optical path, the idler optical path, and the optical path of the pump light.

<Arithmetic Processing>

Figure 10:
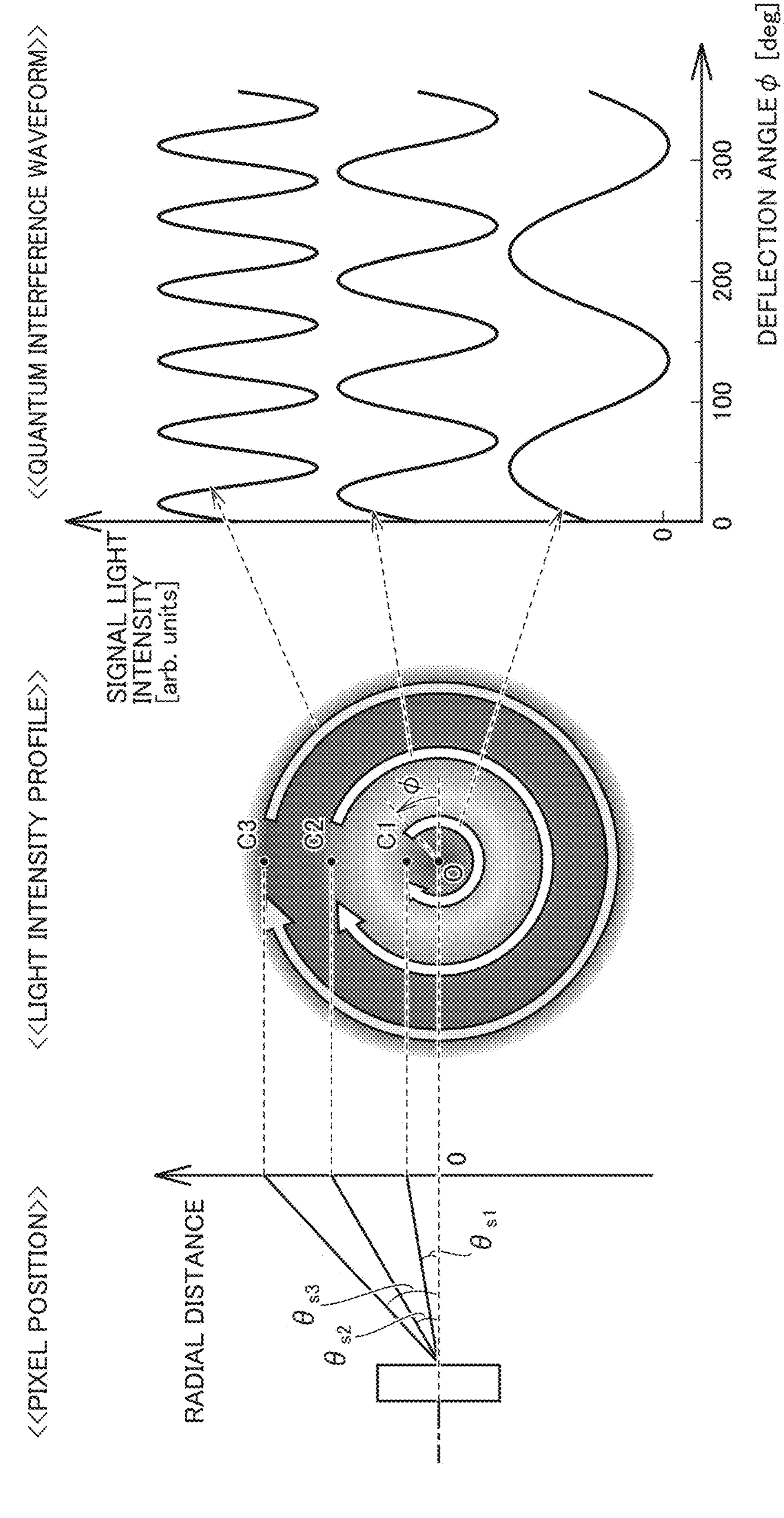
FIG. 10 is a diagram for explaining the details of arithmetic processing by a controller in the second embodiment.

FIG. 10 is a diagram for explaining the contents of arithmetic processing by a controller 4 in the second embodiment. Also in the second embodiment, similarly to the first embodiment, a correspondence between a pixel position and wavelength $\lambda_s$ of the signal photon is obtained in advance. However, the second embodiment is different from the first embodiment in the manner of acquiring a quantum interference waveform.

The position of the pixel is represented in polar coordinates, and a distance from a center O of a light intensity profile is referred to as a "radial distance". A counterclockwise angle (circumferential angle) from an axis passing through center O of the light intensity profile is referred to as a "deflection angle $\varphi$". FIG. 10 shows three circles C1 to C3 having mutually different radial distances. Here, C1 will be described as an example. On C1, the radial distances (radii) are equal between pixels arranged in a circumferential direction. This means that radiation angles $\theta_s$ are equal. Meanwhile, deflection angles $\varphi$ are different between the pixels on C1.

When phase shifter 214 is not disposed on the signal optical path, the phase wavefront of the signal photons detected by the pixels on C1 (the phase of the signal photon at each point in a space) is uniform. Therefore, in the pixels on C1, signal light intensities are equal to each other.

Meanwhile, when phase shifter 214 is disposed on the signal optical path, a distance (signal optical path length) at which the detected signal photon propagates through phase shifter 214 is different for each pixel on C1. Thus, a shift amount corresponding to the signal optical path length is given to the phase of each signal photon. As a result, the phase wavefront of the signal photon becomes non-uniform, and spatial modulation according to the shape of phase shifter 214 is added to the phase of quantum interference. In this example, wavelengths $\lambda_s$ of the signal photons detected in the pixel on C1 are equal, and the signal light intensity measured in the pixel on C1 includes a modulation component according to deflection angle $\varphi$. Therefore, as shown in the right figure, by plotting the signal light intensity with respect to deflection angle $\varphi$, a quantum interference waveform in which the signal light intensity of a specific wavelength component varies can be acquired.

In the second embodiment, a correspondence between a parameter for distinguishing a quantum interference waveform (a parameter for designating a circle such as C1 to C3) and wavelength $\lambda_s$ of the signal photon is obtained in advance, and is stored in a memory 42 of controller 4 in the form of a map, for example.

Figure 11:
FIG. 11 is a conceptual diagram showing an example of a map in the second embodiment.

FIG. 11 is a conceptual diagram showing an example of a map in the second embodiment. In a map MP2, wavelength $\lambda_s$ of the signal photon corresponding to the radial distance is defined for each radial distance for designating a circle such as C1 to C3. The radial distance is another example of the "parameter" according to the present disclosure. By referring to map MP2, the quantum interference waveform can be associated with wavelength $\lambda_s$ of the signal photon. Processing of calculating visibility V of the quantum interference from the subsequent quantum interference waveform (see equation (5)) and processing of calculating a transmittance T from visibility V (see equation (6)) are similar to the processing in the first embodiment.

<Processing Flow>

Figure 12:
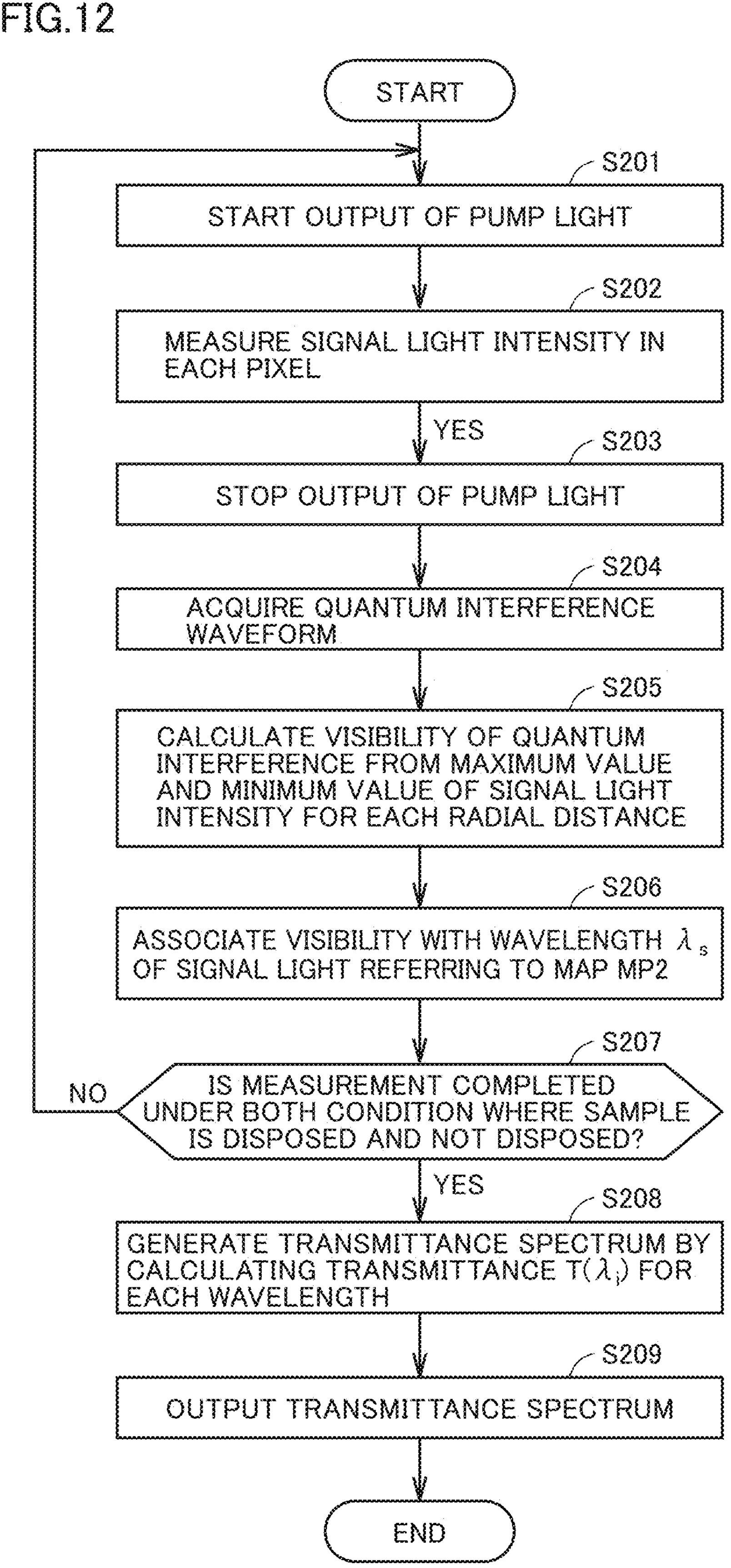
FIG. 12 is a flowchart showing the processing procedure of a quantum absorption spectroscopy method in the second embodiment.

FIG. 12 is a flowchart showing the processing procedure of a QAS method in the second embodiment. Also in this description, it is assumed that a sample is not disposed in a sample holder 208 at the start of execution of the flowchart.

First, a controller 4 controls a light source 1 so as to start the output of pump light (S201). Controller 4 measures a signal light intensity in each of pixels provided on the light receiving surface of an image sensor 3 based on a detection signal from image sensor 3 (S202). Thereafter, controller 4 controls light source 1 so as to stop the output of the pump light (S203).

In S204, controller 4 acquires a quantum interference waveform (see a right diagram in FIG. 10) for each target radial distance. More specifically, controller 4 specifies a center O of a signal light intensity profile. For each pixel arranged on a circle separated from center O by a radial distance, controller 4 calculates a deflection angle φ of the pixel and measures the signal light intensity in the pixel. Controller 4 plots the signal light intensity with respect to deflection angle φ. As a result, a spatially modulated quantum interference waveform is acquired.

In S205, controller 4 calculates, for each radial distance, visibility $V_0$ of quantum interference under the condition where a sample is not disposed from maximum value $I_s^{max}$ and minimum value $I_s^{min}$ of the signal light intensity according to the above equation (5).

In S206, controller 4 associates, for each radial distance, visibility V of quantum interference in the radial distance with wavelength $\lambda_s$ of a signal photon using a map MP2 prepared in advance and stored in a memory 42.

Thereafter, NO is determined in S207, and the processings of S201 to S206 are executed again under the condition where the sample is disposed. As a result, visibility V ($\lambda_s$) of the quantum interference associated with wavelength $\lambda_s$ of the signal photon is calculated. Then, the processing proceeds to S208 (YES in S207). Controller 4 calculates a transmittance T ($\lambda_i$) for each wavelength of the idler photon by taking a ratio between visibility V and visibility $V_0$ of the quantum interference for each wavelength $\lambda_s$ of the signal photon according to the above equation (6). As a result, a transmittance spectrum in the infrared region of the sample is generated.

As described above, also in the second embodiment, the angle dependence of wavelength $\lambda_s$ of the signal photon is used as in the first embodiment. In the second embodiment, a correspondence between the radial distance of the light intensity profile on the light receiving surface of image sensor 3 and wavelength $\lambda_s$ of the signal photon is stored in advance in memory 42 of controller 4 in the form of a map. By using this correspondence, it is possible to obtain, without using a spectrometer, the measurement result of the signal light intensity corresponding to that of dispersing the signal photons. As a result, it is possible to improve the reliability and robustness of QAS system 200 and reduce the cost of components while reducing the size of QAS system 200.

In the first embodiment, the quantum interference waveform in which the signal light intensity of the same pixel (such as P1 to P3) varies with time is acquired by sweeping the idler optical path length. In contrast, in the second embodiment, by plotting the signal light intensity with respect to deflection angle φ after making the phase wavefront of the signal photon non-uniform using the phase shifter, the quantum interference waveform in which the signal light intensity spatially varies on the path (C1 to C3 or the like) having the same radial distance is acquired. This eliminates the need for the sweep of the idler optical path length, making it possible to construct QAS system 200 that does not include even a piezo element. Therefore, according to the second embodiment, QAS system 200 can be further downsized, improved in reliability and robustness, and reduced in the cost of components.

Modifications

<First Modification>

Figure 13:
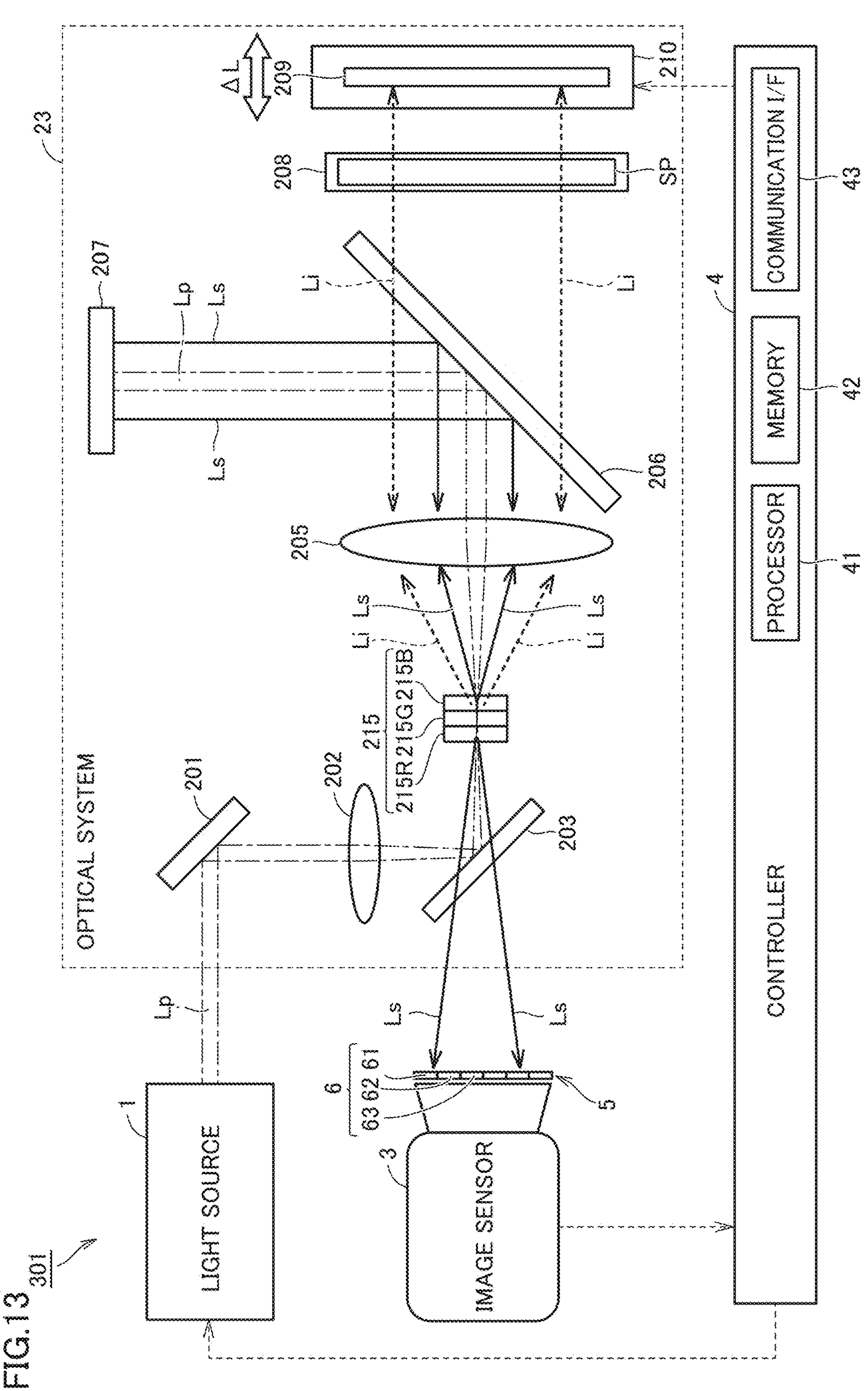
FIG. 13 is a block diagram showing the overall configuration of a quantum absorption spectroscopy system according to a first modification.

FIG. 13 is a block diagram showing the overall configuration of a QAS system according to a first modification. A QAS system 301 includes an optical system 23 instead of optical system 21 (see FIG. 1), and further includes a color filter 5. Optical system 23 is different from optical system 21 in that optical system 23 includes a nonlinear optical unit 215 instead of nonlinear optical crystal 204.

Nonlinear optical unit 215 includes a plurality of nonlinear optical crystals having mutually different phase matching conditions. Center wavelengths $\lambda_s$ of signal photons (visible photons) and center wavelengths $\lambda_i$ of idler photons (infrared photons) are different between the nonlinear optical crystals. The number of the nonlinear optical crystals may be any value greater than or equal to 2. As described below, color filter 5 includes a color resist 6 that enables the color discrimination detection of a plurality of signal photons emitted from a plurality of nonlinear optical crystals. Note that nonlinear optical unit 215 may include a plurality of QPM elements having mutually different polarization inversion periods.

By using nonlinear optical unit 215, signal photons can be generated over a wide wavelength range. By combining a plurality of nonlinear optical crystals so that signal photons in a plurality of wavelength ranges each corresponding to a specific energy transition (molecular absorption or the like) are generated, a QAS system capable of highly accurate substance identification and/or structural analysis can be achieved.

In order to facilitate the understanding, an example in which nonlinear optical unit 215 includes three nonlinear optical crystals 215R, 215G, and 215B will be described below. Nonlinear optical crystals 215R, 215G, and 215B generate red, green, and blue signal photons, respectively. For example, the wavelength range of the blue signal photons is 450 nm to 500 nm, the wavelength range of the green signal photons is 500 nm to 600 nm, and the wavelength range of the red signal photons is 600 nm to 700 nm.

The above combination of wavelength ranges is merely an example, and any combination of wavelength ranges can be adopted. For example, a combination of a wavelength range of 500 nm to 650 nm, a wavelength range of 650 nm to 800 nm, and a wavelength range of 800 nm to 850 nm can be adopted. From the viewpoint of data continuity, some of these wavelength ranges may overlap each other. Meanwhile, a combination of discontinuous wavelength ranges (for example, a combination of a wavelength range of 500 nm to 550 nm, a wavelength range of 650 nm to 700 nm, and a wavelength range of 750 nm to 800 nm) may be adopted. A color filter that selectively transmits photons in a specific wavelength region can be easily created by a general-purpose technology.

Color filter 5 is disposed at the preceding stage of an image sensor 3. When nonlinear optical unit 215 includes three nonlinear optical crystals 215R, 215G, and 215B, a color resist 6 of color filter 5 includes three types of color resists 61 to 63. Each of color resists 61 to 63 selectively transmits signal photons generated by a corresponding nonlinear optical crystal among nonlinear optical crystals 215R, 215G, and 215B. That is, color resist 61 transmits red signal photons generated by nonlinear optical crystal 215R. Color resist 62 transmits green signal photons generated by nonlinear optical crystal 215G. Color resist 63 transmits blue signal photons generated by nonlinear optical crystal 215B. Color resists 61 to 63 are examples of a "plurality of filter elements" according to the present disclosure.

When color filter 5 is not disposed, three types of signal photons (in this example, red, green, and blue photons)

having different wavelengths can reach each of the plurality of pixels arranged on the light receiving surface of image sensor 3. That is, the position of the pixel and wavelength $\lambda_s$ of the signal photon do not correspond one-to-one. By disposing color filter 5, for each pixel, only one type of signal photon that can transmit the color resist provided in the pixel reaches the pixel. As a result, a one-to-one correspondence between the position of the pixel and wavelength $\lambda_s$ of the signal photon is achieved.

Color filter 5 only needs to transmit photons in a specific wavelength range and does not transmit photons in other wavelength ranges. Therefore, color filter 5 is not limited to one using a color resist, and may be formed of, for example, a dielectric multilayer film. Furthermore, a function similar to that of the color filter can be achieved by combining an element that rotates polarized light depending on a wavelength and a polarizing filter that transmits only specific polarized light. The combination can also correspond to a "filter element" according to the present disclosure.

Figure 14:
FIG. 14 is a conceptual diagram showing a map in the first modification.

FIG. 14 is a conceptual diagram showing a map in the first modification. In FIG. 14, the color of the color resist corresponding to each pixel is represented by the type of hatching. In this example, color resists 61 to 63 are disposed in a stripe array in which color resists of the same color are arranged in a vertical direction. Similarly to a map MP1 (see FIG. 5), a correspondence between a pixel coordinate and wavelength $\lambda_s$ of the signal photon is also defined in a map MP3. However, in map MP3, when columns are different, wavelengths $\lambda_s$ of the signal photons are greatly different. By referring to map MP3, wavelength $\lambda_s$ of the signal photon detected by the pixel can be specified for each pixel. Note that the manner of arranging the color resist is not particularly limited, and another arrangement such as a mosaic arrangement may be used.

Figure 15:
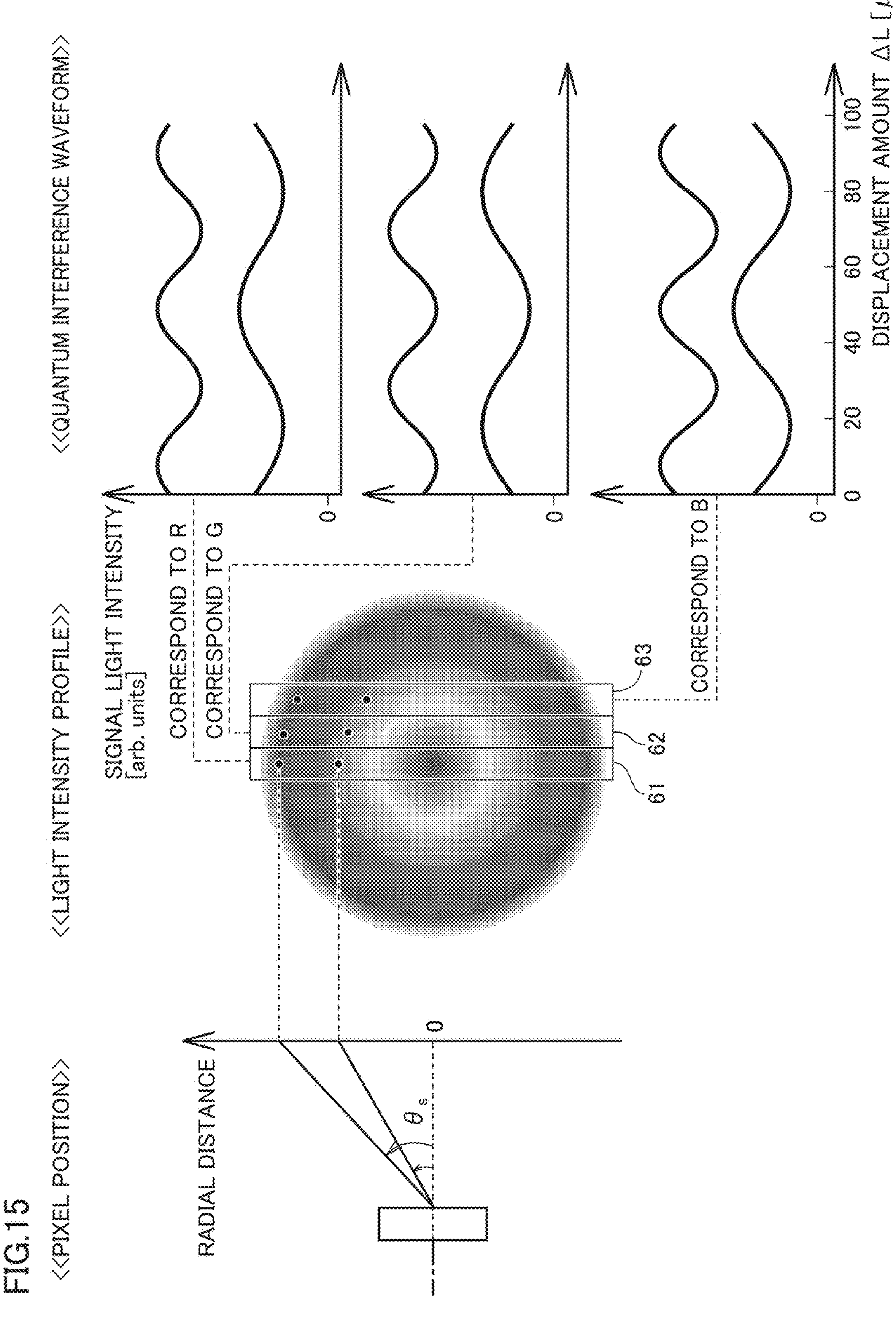
FIG. 15 is a diagram for explaining the contents of arithmetic processing by a controller in a second modification.

FIG. 15 is a diagram for explaining the contents of arithmetic processing by a controller 4 in the first modification. A predetermined number of pixels having mutually different radiation angles $\theta_s$ are selected in advance from a plurality of pixels corresponding to color resist 61 so as to cover a wide radiation angle $\theta_s$. The same applies to the other two types of color resists 62 and 63. Controller 4 acquires a quantum interference waveform from a signal light intensity detected by the selected pixel for each of the three types of color resists 61 to 63 in the same manner as in the first embodiment. Processing of sequentially calculating visibility V and transmittance T of the quantum interference from the subsequent quantum interference waveform is similar to the processing in the first embodiment. The processing procedure of the QAS in the modification is also basically similar to the processing procedure (see FIG. 8) in the first embodiment, and thus the detailed description using a flowchart will not be repeated.

As described above, according to the first modification, it is possible to generate the signal photons over a wide wavelength range by adopting nonlinear optical unit 215 including a plurality of nonlinear optical crystals having mutually different phase matching conditions. Furthermore, by providing color filter 5 in image sensor 3, the signal photons (signal photons of three colors in the above example) over a wide wavelength range can be simultaneously detected in separate pixels. Therefore, the light intensity profile of the signal photons over a wide wavelength range can be measured by one detection operation of image sensor 3.

<Second Modification>

Figure 16:
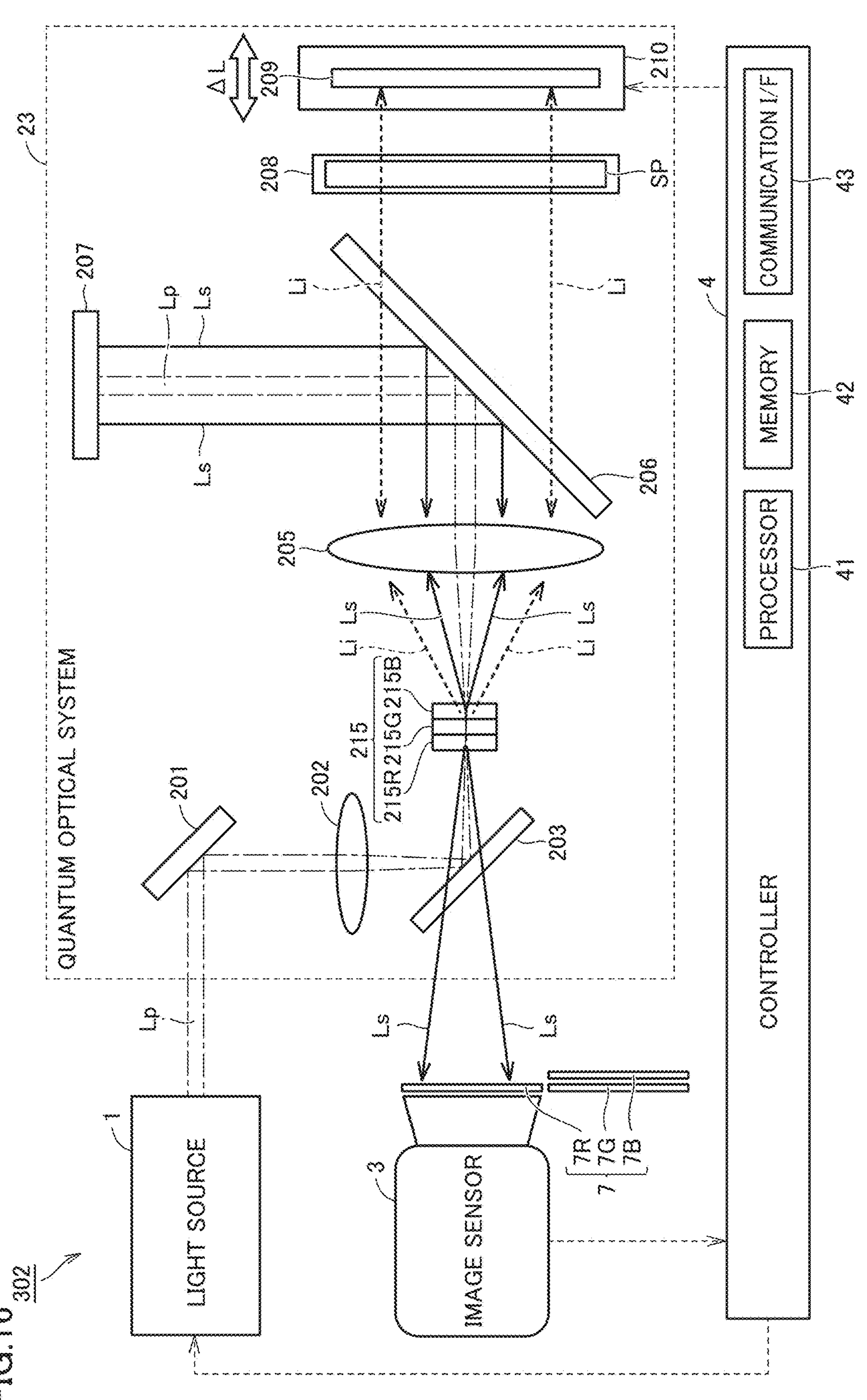
FIG. 16 is a block diagram showing the overall configuration of a quantum absorption spectroscopy system according to the second modification.

FIG. 16 is a block diagram showing the overall configuration of a QAS system according to a second modification. A QAS system 302 includes an optical system 23 and a color filter unit 7 instead of color filter 5.

Color filter unit 7 includes, for example, three types of color filters 7R, 7G, and 7B. While one color filter 5 includes three types of color resists 61 to 63, color filter unit 7 includes three color filters 7R, 7G, and 7B each including one type of color resist. Color filters 7R, 7G, and 7B transmit red, green, and blue signal photons, respectively. Color filters 7R, 7G, and 7B are another examples of a "plurality of filter elements" according to the present disclosure.

Figure 17:
FIG. 17 is a conceptual diagram showing a map in the second modification.

FIG. 17 is a conceptual diagram showing a map in the second modification. As shown in FIG. 17, in a map MP4, a correspondence between a pixel coordinate and wavelength $\lambda_s$ of the signal photon may be separately defined for each of color filters 7R, 7G, and 7B.

Color filters 7R, 7G, and 7B are sequentially switched. For example, first, the light intensity profile of the red signal photons is measured using color filter 7R. Next, the light intensity profile of the green signal photons is measured using color filter 7G. Finally, the light intensity profile of the blue signal photons is measured using color filter 7B. Processing of sequentially calculating a quantum interference waveform, visibility V of quantum interference, and a transmittance T based on the signal light intensity profile is similar to the processing in the first embodiment, and thus the description thereof will not be repeated.

As described above, also in the second modification, similarly to the first modification, it is possible to generate the signal photons over a wide wavelength range by adopting a nonlinear optical unit 215. By providing color filter unit 7 in an image sensor 3, a one-to-one correspondence between the position of a pixel and wavelength $\lambda_s$ of the signal photon can be achieved. When comparison is made on the condition where the number of pixels and pixel size of image sensor 3 are common, in the second modification, pixels capable of detecting signal photons of the same color are disposed at a high density (in the above example, a density three times) as compared with the first modification, so that wavelength resolution can be improved.

In summary, both in the first modification and the second modification, the angle dependence of wavelength $\lambda_s$ of the signal photon is used as in the first embodiment. This makes it possible to obtain, without using a spectrometer, the measurement result of the signal light intensity corresponding to that of dispersing the signal photons. Since the visibility of the quantum interference is calculated from the quantum interference waveform, a piezoelectric element can be employed as delay stage 210 instead of the mechanical stage. Therefore, according to the modification, it is also possible to reduce the size and cost components of QAS system 301 while improving the reliability and robustness of QAS system 301.

Furthermore, QAS systems 301, 302 include a nonlinear optical unit 215 including a plurality of nonlinear optical crystals or QPM elements having mutually different phase matching conditions. This enables to generate signal photons of multiple wavelengths, thereby making it possible to measure the transmittance spectrum of the sample over a wider wavelength range as compared with QAS system 100 according to the first embodiment.

In FIGS. 13 to 17, the configuration in which nonlinear optical unit 215 and color filter 5 are applied to QAS system 100 (see FIG. 1) according to the first embodiment has been described as an example. However, nonlinear optical unit 215 and color filter 5 can also be applied to QAS system 200 (see FIG. 9) according to the second embodiment.

It should be understood that the embodiments disclosed herein are illustrative and non-restrictive in all respects. The scope of the present disclosure is defined by the claims, rather than the embodiments above, and is intended to include any modifications within the meaning and scope equivalent to the claims.

REFERENCE SIGNS LIST

1: light source, 21, 22, 23: optical system, 3: image sensor, 4: controller, 41: processor, 42: memory, 43: interface, 5: color filter, 6, 61, 62, 63: color resist, 7: color filter unit, 7R, 7G, 7B: color filter, 201: mirror, 202: lens, 203: dichroic mirror, 204: nonlinear optical crystal, 204A: first crystal, 204B: second crystal, 205: lens, 206: dichroic mirror, 207: fixed mirror, 208: sample holder, 209: moving mirror, 210: delay stage, 211: fixed mirror, 212: dichroic mirror, 213: fixed mirror, 214: phase shifter, 215: nonlinear optical unit, 215B, 215G, 215R: nonlinear optical crystal, 100, 200, 301, 302: QAS system.

The invention claimed is:

1. A system for quantum absorption spectroscopy, the system comprising:
- a quantum interferometer configured to cause quantum interference between a plurality of physical processes in each of which a quantum entangled photon pair of a signal photon and an idler photon is generated by irradiation with pump light;
- a photodetector that includes a light receiving surface on which a plurality of pixels are disposed and configured to detect the signal photon;
- a memory that stores a correspondence between a parameter indicating a position of each pixel on the light receiving surface and a wavelength of the signal photon detected by the pixel; and
- a processor configured to execute arithmetic processing for calculating a spectral characteristic of a sample disposed on an optical path of the idler photon, wherein
  - the quantum interferometer includes a modulator configured to apply modulation to a phase of the quantum interference, the modulator includes at least one phase shifter disposed on an optical path of at least one of the signal photons, the idler photon, and the pump light, the at least one phase shifter is configured to apply the modulation to the phase of the quantum interference depending on the position of the pixel on the light receiving surface,
  - the processor is configured to:
    - acquire, from a predetermined number of pixels disposed on the light receiving surface and to which wavelengths of the detected signal photons are the same, a variation in a detection intensity of the signal photon caused by the modulation by the at least one phase shifter, and
    - calculate the spectral characteristic based on visibility of the quantum interference obtained from the variation and the correspondence.

2. The system according to claim 1, wherein the processor configured to generate a transmittance spectrum of the sample by calculating, for each wavelength of the signal photon corresponding to the predetermined number of pixels, a transmittance of the sample based on the visibility.

3. A system for quantum absorption spectroscopy, the system comprising:
- a quantum interferometer configured to cause quantum interference between a plurality of physical processes in each of which a quantum entangled photon pair of a signal photon and an idler photon is generated by irradiation with pump light;
- a photodetector that includes a light receiving surface on which a plurality of pixels are disposed and configured to detect the signal photon;
- a memory that stores a correspondence between a parameter indicating a position of each pixel on the light receiving surface and a wavelength of the signal photon detected by the pixel; and
- a processor configured to execute arithmetic processing for calculating a spectral characteristic of a sample disposed on an optical path of the idler photon, wherein
  - the quantum interferometer includes a modulator configured to apply modulation to a phase of the quantum interference, the modulator includes a moving mirror configured to reflect one of the signal photon and the idler photon to temporally modulate the phase of the quantum interference according to a displacement amount of the moving mirror,
- and
  - the processor is configured to:
    - acquire, from a predetermined number of pixels disposed on the light receiving surface, a variation in a detection intensity of the signal photon caused by the modulation by displacement of the moving mirror, and
    - calculate the spectral characteristic based on visibility of the quantum interference obtained from the variation and the correspondence.

4. A system for quantum absorption spectroscopy, the system comprising:
- a quantum interferometer configured to cause quantum interference between a plurality of physical processes in each of which a quantum entangled photon pair of a signal photon and an idler photon is generated by irradiation with pump light;
- a photodetector that includes a light receiving surface on which a plurality of pixels are disposed and configured to detect the signal photon;
- a memory that stores a correspondence between a parameter indicating a position of each pixel on the light receiving surface and a wavelength of the signal photon detected by the pixel; and
- a processor configured to execute arithmetic processing for calculating a spectral characteristic of a sample disposed on an optical path of the idler photon, wherein
  - the quantum interferometer includes
    - a modulator configured to apply modulation to a phase of the quantum interference, and
    - a plurality of nonlinear optical elements having mutually different phase matching conditions,
  - the system further comprises a plurality of filter elements provided in the photodetector, the plurality of filter elements corresponding to the plurality of nonlinear optical elements, and
  - each of the plurality of filter elements is configured to selectively transmit a signal photon generated by a corresponding one of the plurality of nonlinear optical elements,
  - the processor is configured to:
    - acquire, from a predetermined number of pixels disposed on the light receiving surface, a variation in a detection intensity of the signal photon caused by the modulation by the modulator, and
    - calculate the spectral characteristic based on visibility of the quantum interference obtained from the variation and the correspondence.

5. The system according to claim 3, wherein the displacement amount of the moving mirror is shorter than a submillimeter order.

6. The system according to claim 3, wherein the modulator includes a piezoelectric transducer configured to displace the moving mirror according to an applied voltage.

7. The system according to claim 3, wherein the quantum interferometer includes:

a nonlinear optical element configured to generate the signal photon and the idler photon from the pump light, and a lens configured to collect the pump light and focus the collected pump light on the nonlinear optical crystal.

8. The system according to claim 7, wherein the quantum interferometer further includes a mirror configured to reflect, of the signal photon and the idler photon, a photon other than the one of the signal photon and the idler photon reflected by the moving mirror.

9. The system according to claim 3, wherein the processor is configured to calculate the visibility based on a differential coefficient of a quantum interference waveform indicating the detection intensity of the signal photon.

10. The system according to claim 3, wherein the processor is configured to generate a transmittance spectrum of the sample by calculating, for each wavelength of the signal photon corresponding to the predetermined number of pixels, a transmittance of the sample based on the visibility.

11. The system according to claim 1, wherein the at least one phase shifter is configured to make a phase wavefront of the signal photon non-uniform among the predetermined number of pixels.

12. The system according to claim 1, wherein the quantum interferometer is configured so that a light intensity profile at the light receiving surface has a circular shape with a center, the correspondence defines, for each radial distance from the center, the wavelength of the signal photon corresponding to the radial distance, the processor is configured to acquire the variation by plotting, for each pixel arranged on a circle at the same radial distance from the center, the detection intensity of the signal photon with respect to a deflection angle from an axis passing through the center.

13. The system according to claim 1, wherein each of the at least one phase shifter is configured so that the optical path of the at least one of the signal photon, the idler photon and the pump light varies according to the propagation path in the phase shifter.

14. The system according to claim 13, wherein the at least one phase shifter includes a first phase shifter having a triangular prism shape with a wedge-shaped cross section in a direction parallel to the optical path.

15. The system according to claim 13, wherein the at least one phase shifter includes a second phase shifter having a quadrangular prism shape with a trapezoidal cross section in a direction parallel to the optical path.

16. The system according to claim 4, wherein each of the plurality of filter elements is configured to transmit the signal photon in a specific wavelength range and cut off the signal photon in a range other than the specific wavelength range.

17. The system according to claim 4, wherein the plurality of filter elements includes a polarizer configured to rotate polarized light depending on a wavelength and a polarizing filter configured to selectively transmit specific polarized light.

18. The system according to claim 4, wherein the processor is configured to generate a transmittance spectrum of the sample by calculating, for each wavelength of the signal photon corresponding to the predetermined number of pixels, a transmittance of the sample based on the visibility.

* * * * *